United States Patent
Isshiki et al.

(10) Patent No.: US 10,355,329 B2
(45) Date of Patent: Jul. 16, 2019

(54) BATTERY UNIT, BATTERY MODULE, POWER STORAGE SYSTEM, ELECTRONIC DEVICE, POWER SYSTEM, AND ELECTRIC VEHICLE

(71) Applicant: Murata Manufacturing Co., Ltd., Kyoto (JP)

(72) Inventors: Ryota Isshiki, Koriyama (JP); Tetsuo Inakawa, Koriyama (JP); Munenori Inden, Koriyama (JP); Ryo Tanabe, Koriyama (JP); Yasuhiro Tonomura, Koriyama (JP); Naruhiko Endo, Koriyama (JP); Hiroaki Ono, Koriyama (JP); Junpei Ikeno, Koriyama (JP); Noritsugu Yoshizawa, Koriyama (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 14/380,587

(22) PCT Filed: Feb. 7, 2013

(86) PCT No.: PCT/JP2013/053600
§ 371 (c)(1),
(2) Date: Aug. 22, 2014

(87) PCT Pub. No.: WO2013/145917
PCT Pub. Date: Oct. 3, 2013

(65) Prior Publication Data
US 2015/0017504 A1    Jan. 15, 2015

(30) Foreign Application Priority Data

Mar. 27, 2012 (JP) .................. 2012-071471

(51) Int. Cl.
*H01M 10/6551* (2014.01)
*B60L 3/00* (2019.01)
(Continued)

(52) U.S. Cl.
CPC ....... *H01M 10/6551* (2015.04); *B60L 3/0046* (2013.01); *B60L 7/12* (2013.01);
(Continued)

(58) Field of Classification Search
None
See application file for complete search history.

(56) References Cited

U.S. PATENT DOCUMENTS 5,756,227 A * 5/1998 Suzuki ............ F28F 3/02
429/120
5,890,606 A * 4/1999 Kuipers ............ H01M 2/1077
211/186
(Continued)

FOREIGN PATENT DOCUMENTS

CN 102388480 A 3/2012
DE 102008061755 A1 6/2010
(Continued)

OTHER PUBLICATIONS

International Search Report issued in connection with International Application No. PCT/JP2013/053600, dated May 14, 2013. (4 pages).
(Continued)

*Primary Examiner* — Alix E Eggerding
(74) *Attorney, Agent, or Firm* — Chip Law Group

(57) ABSTRACT

Provided is a battery module including a plurality of stacked battery units. Each of the battery units is arranged in a manner that a face of a heat-transfer plate held by a battery support body formed from an insulating material and a main face of a battery cell oppose each other.

18 Claims, 22 Drawing Sheets

(51) Int. Cl.
*B60L 7/12* (2006.01)
*B60L 7/14* (2006.01)
*H01M 2/10* (2006.01)
*H01M 2/20* (2006.01)
*H01M 10/04* (2006.01)
*H01M 10/6555* (2014.01)
*H01M 10/613* (2014.01)
*B60L 53/14* (2019.01)
*B60L 50/40* (2019.01)
*B60L 50/61* (2019.01)
*B60L 50/16* (2019.01)
*B60L 53/64* (2019.01)
*B60L 55/00* (2019.01)
*B60L 53/63* (2019.01)
*B60L 53/65* (2019.01)
*B60L 53/66* (2019.01)
*B60L 58/12* (2019.01)
*B60L 58/21* (2019.01)
*B60L 58/26* (2019.01)
*B60L 50/64* (2019.01)
*B60L 53/30* (2019.01)
*B60L 53/51* (2019.01)
*B60L 53/52* (2019.01)
*H01M 10/052* (2010.01)

(52) U.S. Cl.
CPC ............... *B60L 7/14* (2013.01); *B60L 50/16* (2019.02); *B60L 50/40* (2019.02); *B60L 50/61* (2019.02); *B60L 50/64* (2019.02); *B60L 53/14* (2019.02); *B60L 53/305* (2019.02); *B60L 53/51* (2019.02); *B60L 53/52* (2019.02); *B60L 53/63* (2019.02); *B60L 53/64* (2019.02); *B60L 53/65* (2019.02); *B60L 53/665* (2019.02); *B60L 55/00* (2019.02); *B60L 58/12* (2019.02); *B60L 58/21* (2019.02); *B60L 58/26* (2019.02); *H01M 2/1077* (2013.01); *H01M 2/206* (2013.01); *H01M 10/0481* (2013.01); *H01M 10/613* (2015.04); *H01M 10/6555* (2015.04); *B60L 2200/12* (2013.01); *B60L 2210/30* (2013.01); *B60L 2210/40* (2013.01); *B60L 2240/12* (2013.01); *B60L 2240/14* (2013.01); *B60L 2240/441* (2013.01); *B60L 2240/662* (2013.01); *B60L 2240/665* (2013.01); *B60L 2240/70* (2013.01); *B60L 2250/16* (2013.01); *B60L 2270/145* (2013.01); *H01M 10/052* (2013.01); *H01M 2220/10* (2013.01); *H01M 2220/20* (2013.01); *Y02E 60/122* (2013.01); *Y02E 60/721* (2013.01); *Y02T 10/6217* (2013.01); *Y02T 10/7005* (2013.01); *Y02T 10/7022* (2013.01); *Y02T 10/7044* (2013.01); *Y02T 10/7061* (2013.01); *Y02T 10/7077* (2013.01); *Y02T 10/7088* (2013.01); *Y02T 10/7241* (2013.01); *Y02T 10/7291* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | | | |
|---|---|---|---|---|
| 9,071,066 | B2* | 6/2015 | Iwamoto | H02J 7/0055 |
| 2006/0170394 | A1* | 8/2006 | Ha | H01M 2/1022 |
| | | | | 320/107 |
| 2007/0015050 | A1* | 1/2007 | Jung | H01M 2/1061 |
| | | | | 429/152 |
| 2008/0090137 | A1* | 4/2008 | Buck | H01M 2/1077 |
| | | | | 429/120 |
| 2009/0029253 | A1* | 1/2009 | Itou | H01M 4/525 |
| | | | | 429/223 |
| 2010/0266883 | A1* | 10/2010 | Koetting | H01M 2/1077 |
| | | | | 429/96 |
| 2010/0304203 | A1* | 12/2010 | Buck | H01M 2/1072 |
| | | | | 429/120 |
| 2011/0223457 | A1 | 9/2011 | Lee et al. | |
| 2012/0148887 | A1* | 6/2012 | Thaler | H01M 2/1072 |
| | | | | 429/72 |
| 2013/0196196 | A1* | 8/2013 | Obeidi | H01M 10/443 |
| | | | | 429/82 |

FOREIGN PATENT DOCUMENTS

| | | |
|---|---|---|
| JP | 08-314588 | 11/1996 |
| JP | 11-111250 | 4/1999 |
| JP | 2004-031281 | 1/2004 |
| JP | 2004-227788 | 8/2004 |
| JP | 2007-151209 | 6/2007 |
| JP | 2010-244949 | 10/2010 |
| JP | 2012-004398 A | 1/2012 |
| JP | 2012-033709 | 2/2012 |
| JP | 2012-033709 A | 2/2012 |
| WO | 2010/067943 | 6/2010 |
| WO | 2010/081704 A2 | 7/2010 |
| WO | WO 2011/154193 | * 12/2011 |

OTHER PUBLICATIONS

Office Action for CN Patent Application No. 201380010221.0, dated Sep. 21, 2017, 11 pages of Office Action and 16 pages of English Translation.

Communication under Rule 71(3) EPC of EP Patent Application No. 13770227.0, dated Jan. 24, 2019, 54 pages.

* cited by examiner

FIG. 5
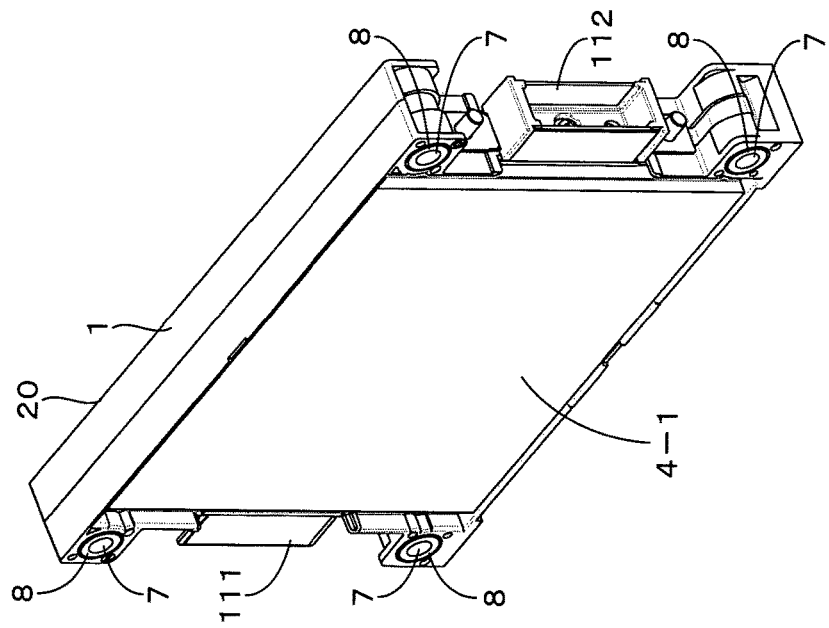
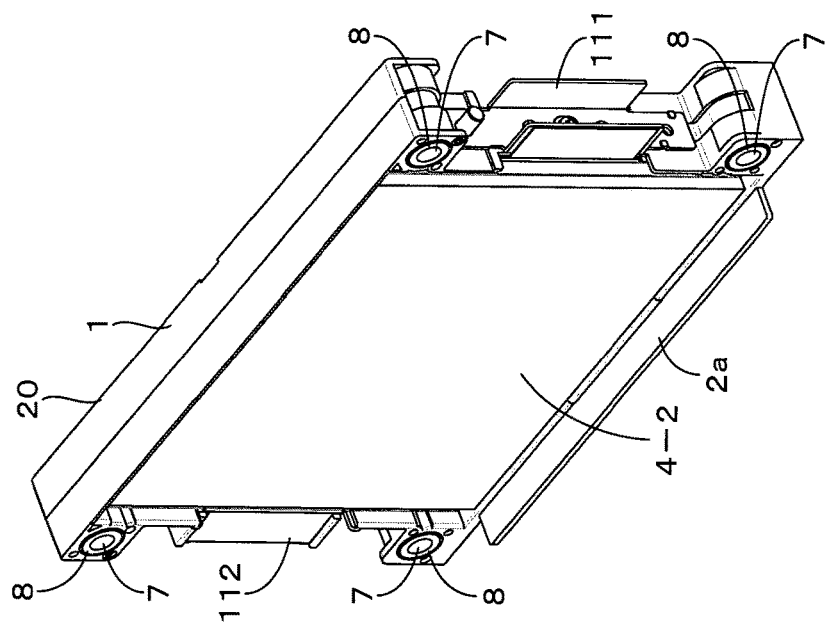

FIG. 12
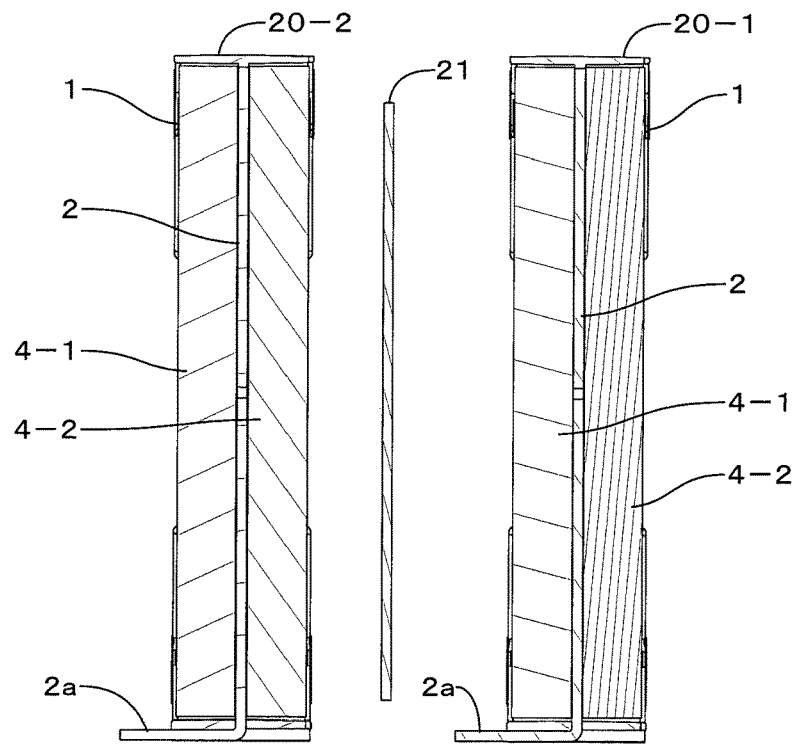
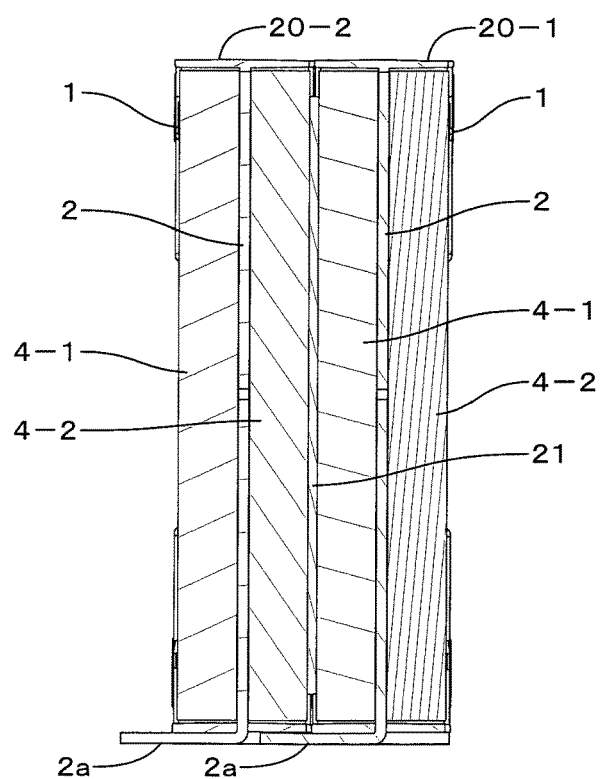

FIG. 13
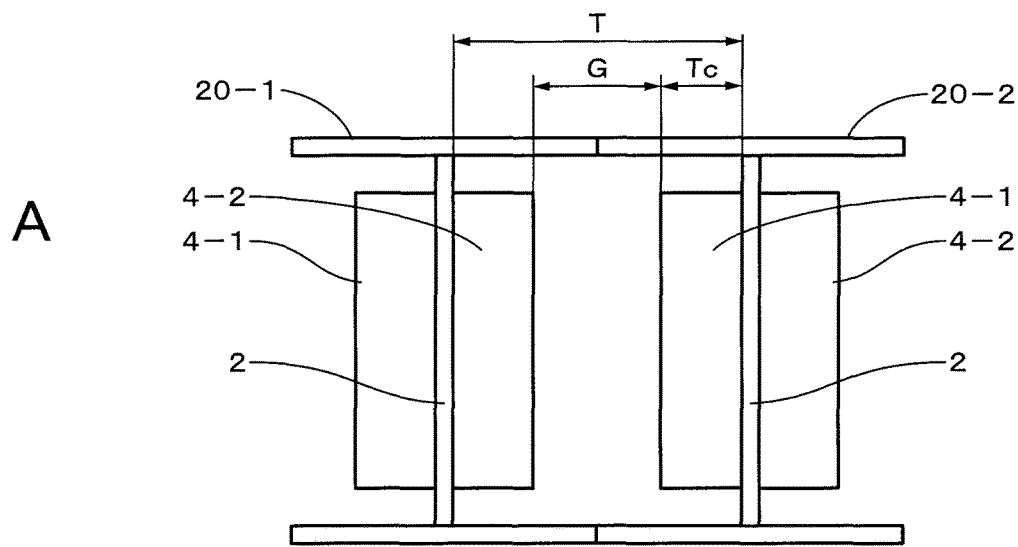
A
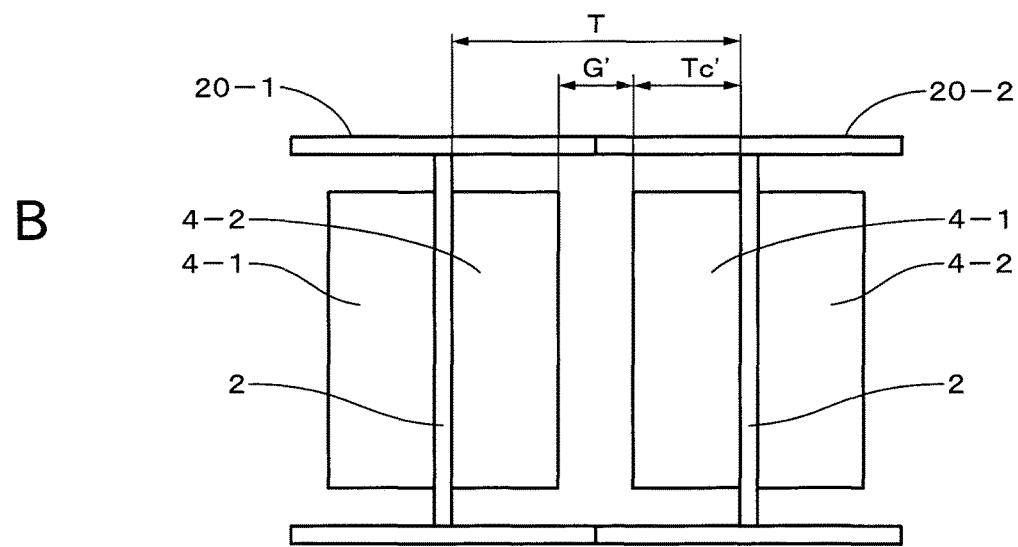
B

FIG. 14
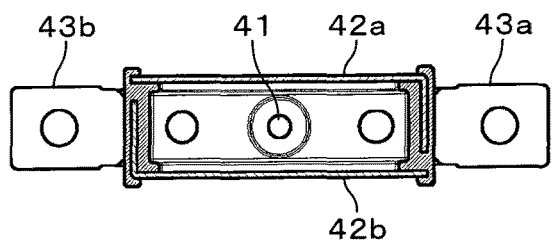
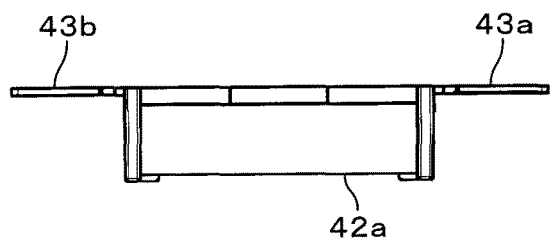
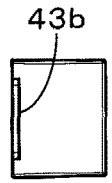 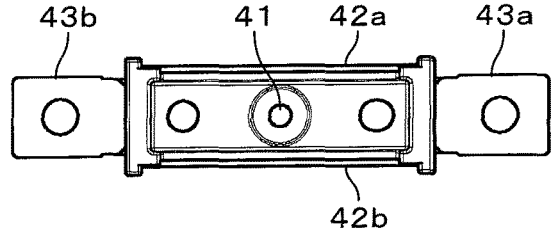 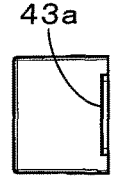
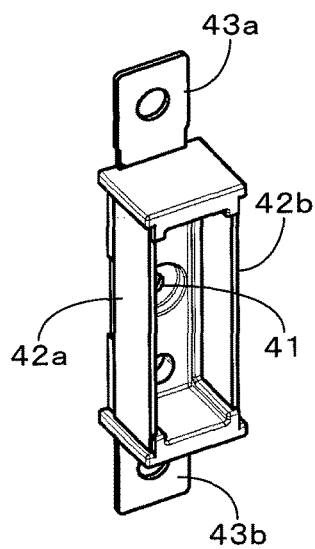

FIG. 15
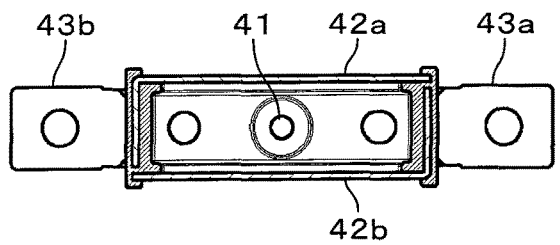
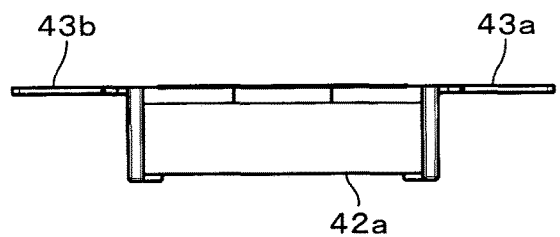
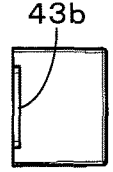 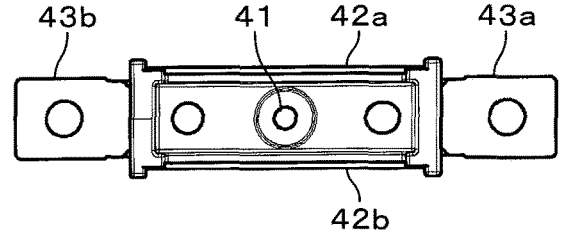 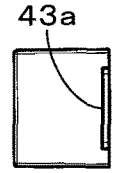
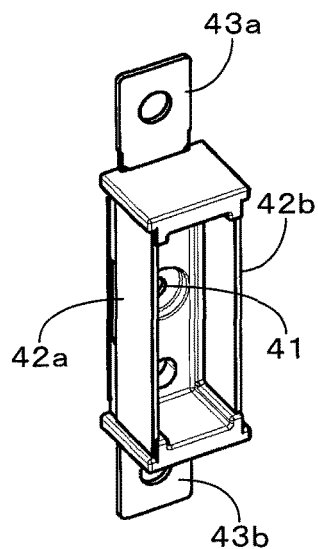

FIG. 17
A
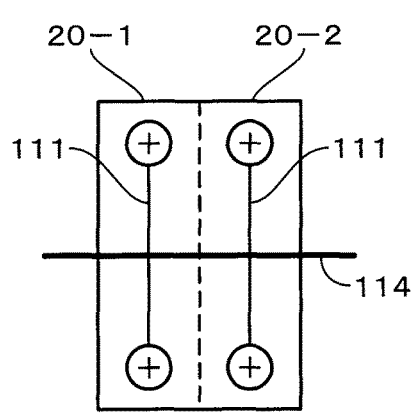
B
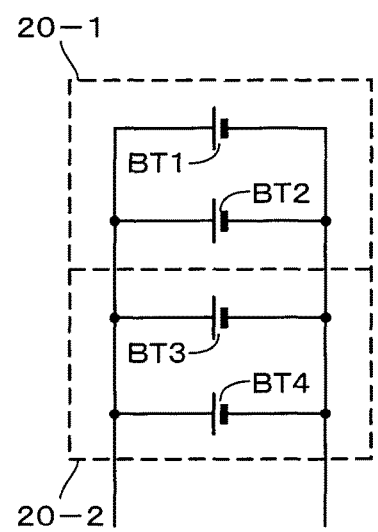
C
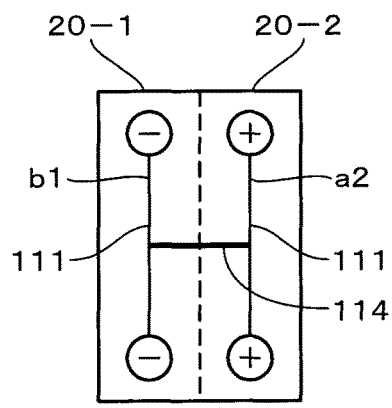
D
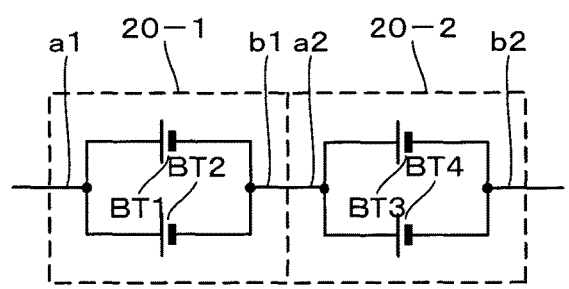

FIG. 19
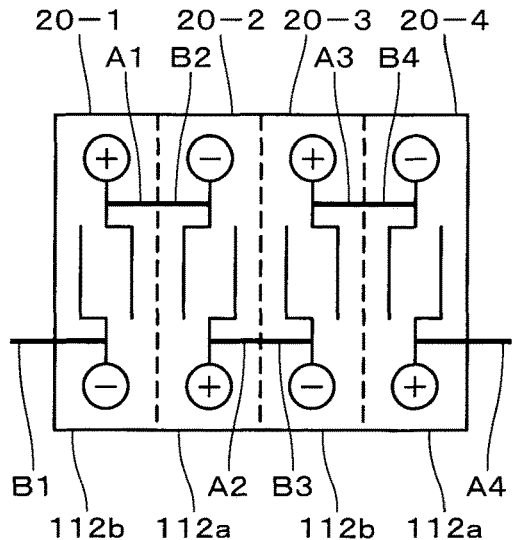
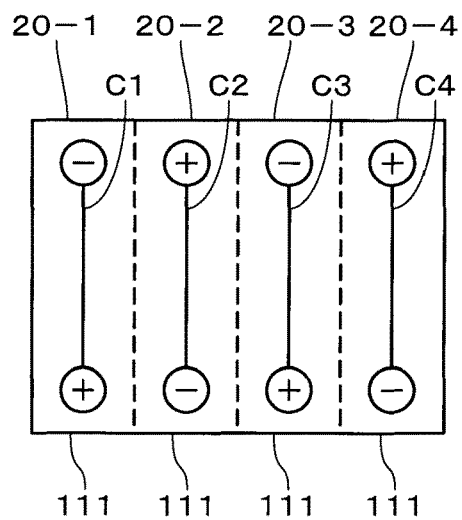
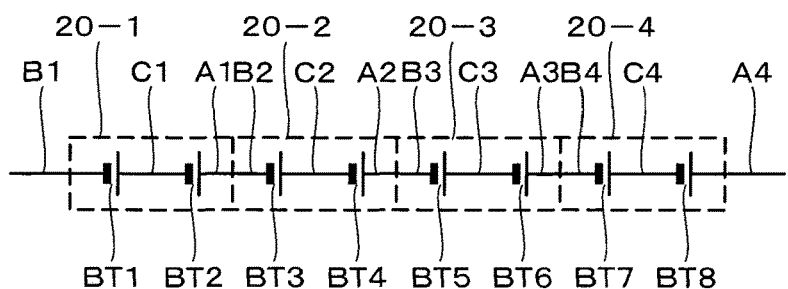

BATTERY UNIT, BATTERY MODULE, POWER STORAGE SYSTEM, ELECTRONIC DEVICE, POWER SYSTEM, AND ELECTRIC VEHICLE

CROSS REFERENCES TO RELATED APPLICATIONS

The present application is a national stage of International Application No. PCT/JP2013/053600 filed on Feb. 7, 2013 and claims priority to Japanese Patent Application No. 2012-071471 filed on Mar. 27, 2012, the disclosure of which is incorporated herein by reference.

BACKGROUND

The present disclosure relates to a battery unit, a battery module, a power storage system, an electronic device, a power system, and an electric vehicle.

Lithium ion secondary batteries that use carbon for a negative electrode, a lithium-transition metal composite oxide for a positive electrode, and a carbonate mixture for an electrolyte have been widely known for some time. In a lithium ion secondary battery having such a configuration, since the carbonate is stable to the oxidation and reduction of water and other organic solvents and can obtain a higher voltage, a larger energy density and a higher capacity can be obtained than for a nickel-hydrogen battery, which is an water-based battery. Consequently, lithium ion secondary batteries are becoming widely spread as a secondary battery for power tools, laptop computers, mobile phones, video cameras, digital still cameras and the like.

Recently, lithium ion secondary batteries have started to spread into applications other than those mentioned above, even into industrial uses for electric vehicles, power storage and the like. Industrial secondary batteries need to have high capacity, high power output, and long life battery qualities. One of the battery qualities required in order to withstand high current is heat-release properties. When a high current is applied, heat is generated. However, an excessive increase in battery temperature is known to accelerate degradation of battery performance, and shorten battery life. Accordingly, how efficiently the heat generated by the battery can be released becomes important. This issue is now the subject of various studies.

For example, the following Patent Literature 1 discloses a configuration of a lithium ion battery for a vehicle, in which when four lithium ion batteries are stacked, a metal heat sink that has been subjected to an insulating treatment is arranged between each of the batteries, and the lithium ion batteries, the heat sink, and an end plate are clamped together by a clamping belt.

CITATION LIST

Patent Literature

Patent Literature 1: JP 2004-227788A

SUMMARY

Technical Problem

However, in the configuration described in Patent Literature 1, the lithium ion battery and the metal heat sink are separate parts. The stacking state is fixed by only the clamping force of the clamping belt, so that there is the problem that the stacking state tends to fall apart. Further, there is also the problem that it is impossible to stack a large number of batteries. In addition, if the lithium ion battery is used for a long duration, the battery expands compared with its initial state. The configuration described in Patent Literature 1 to counter such battery expansion suppresses expansion with a clamping force. However, for a lithium ion battery that has a laminate film exterior, if the clamping force is too strong, damage can be caused to the battery itself, so that an expansion countermeasure like that in Patent Literature 1 cannot be employed.

Therefore, it is an object of the present disclosure to provide a battery unit, a battery module, a power storage system, an electronic device, a power system, and an electric vehicle, that are capable of handling battery expansion while improving a heat release effect.

Solution to Problem

In order to achieve the above-mentioned object, an embodiment of the present invention is a battery module including a plurality of stacked battery units. The battery unit is arranged in a manner that a face of a heat-transfer plate held in a battery support body formed from an insulating material and a main face of a battery cell oppose each other.

An embodiment of the present invention is a battery unit in which a battery support body which holds a hot-transfer plate, the battery support body being formed from an insulating material, a face of the heat-transfer plate, and a main face of a battery cell are arranged to oppose one another.

An embodiment of the present invention, is a power storage system in which the above-described battery module is charged by a power generation device which generates power from renewable energy.

An embodiment of the present invention is a power storage system that includes the above-described battery module, in which the power storage system supplies power to an electronic device connected to the battery module.

An embodiment of the present invention is an electronic device configured to receive power supplied from the above-described battery module.

An embodiment of the present invention is an electric vehicle including a conversion device configured to receive power supplied from the above-described battery module and convert the received power into driving power of a vehicle, and a control device configured to perform information processing relating to vehicle control based on information about the battery module.

An embodiment of the present invention is a power system that has a power information transmitting/receiving unit configured to transmit/receive signals to/from other devices via a network, in which the power system is configured to control charge/discharge of the battery module based on information received by the power information transmitting/receiving unit.

An embodiment of the present invention is a power system configured to receive power supplied from the above-described battery module, or to supply power to the battery module from a power generation device or a power network.

Advantageous Effects of Invention

According to the present disclosure, a heat-transfer plate is fixed to a battery support body, and each of the main faces of two battery cells are closely adhered to either side of the heat-transfer plate. Heat generated by the battery cells is transmitted to the heat-transfer plate. By making the heat-transfer plate externally protrude from a side face of the battery support body, an external cooling module and the protruding portion of the heat-transfer plate can come into contact to release heat. Since both the heat-transfer plate and the battery cells are fixed to the battery support body, the attachment state of these parts is stable. Similarly, a battery module including such stacked battery units can also have a stable attachment state between the heat-transfer plate and the battery cells.

Additional features and advantages are described herein, and will be apparent from the following Detailed Description and the figures.

BRIEF DESCRIPTION OF THE FIGURES

FIG. 5 is perspective view of a battery unit according to the present disclosure.

FIGS. 12A and 12B are perspective views illustrating a stacking configuration of battery units according to the present disclosure.

FIGS. 13A and 13B are schematic cross-sectional views illustrating expansion/contraction of a battery cell in a battery unit stacking configuration according to the present disclosure.

FIG. 14 is a front view, a side view, a planar view, a partial cross-sectional view, and a perspective view illustrating an individual cell bus bar.

FIG. 15 is a front view, a side view, a planar view, a partial cross-sectional view, and a perspective view illustrating an individual cell bus bar.

FIGS. 17A to 17D are font views and connection diagrams illustrating a connection portion of an individual cell bus bar.

FIGS. 19A to 19C are font views and a connection diagram illustrating a connection portion of an individual cell bus bar.

DETAILED DESCRIPTION

Battery Module Schematic Configuration

Figure 1:
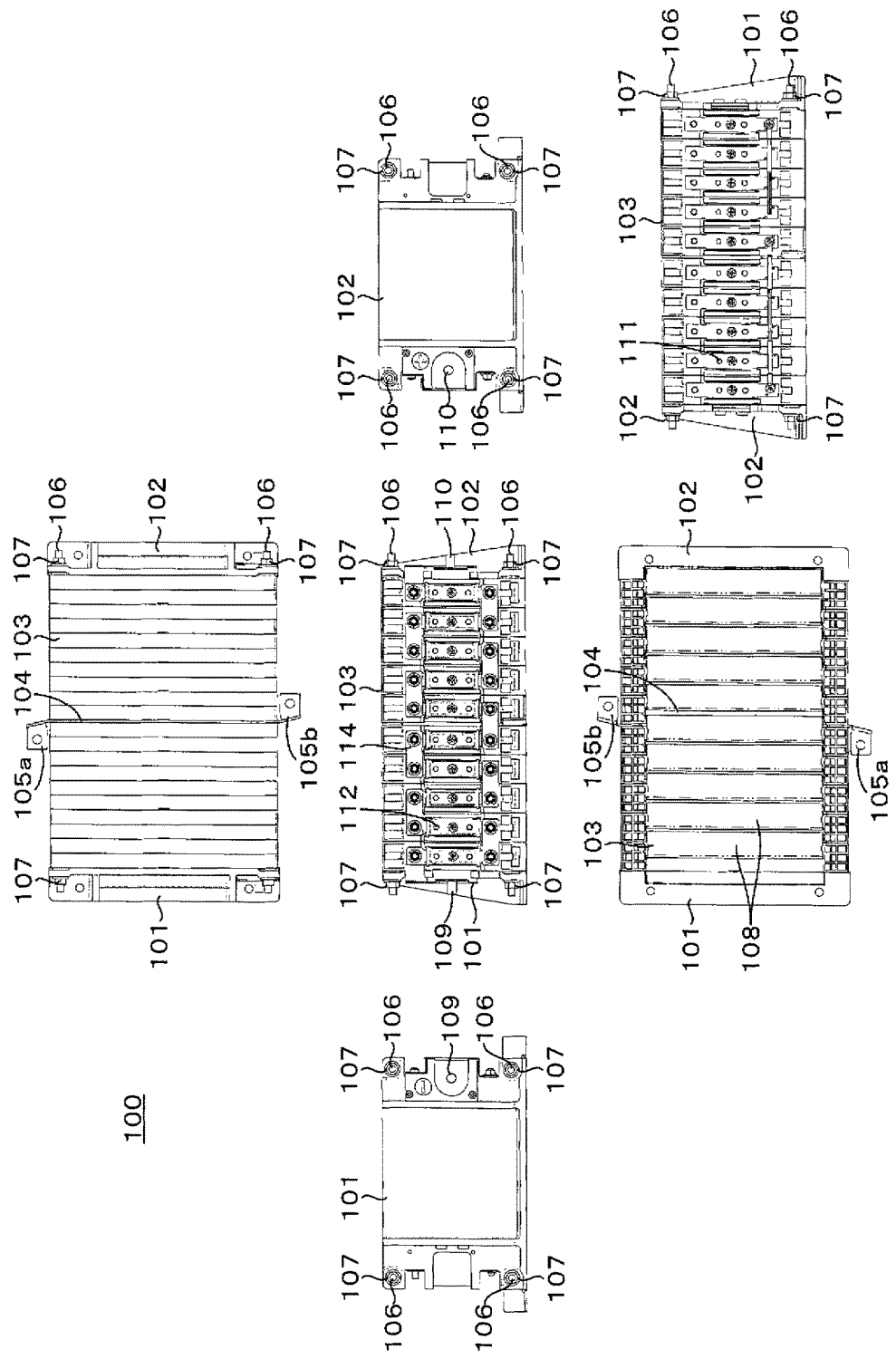
FIG. 1 is a diagram illustrating six views of the overall configuration of an embodiment of a battery module according to the present disclosure.
Figure 2:
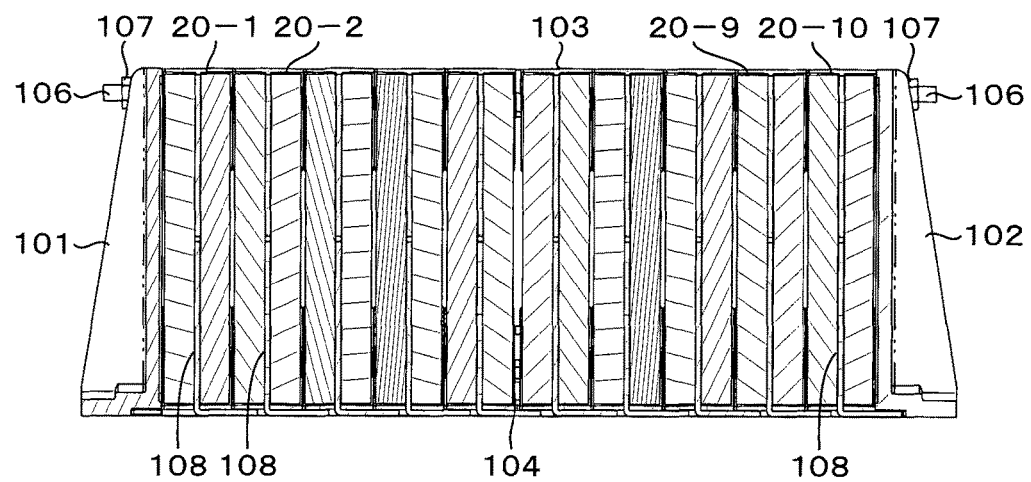
FIG. 2 is a cross-sectional view of an embodiment of a battery module according to the present disclosure.
Figure 3:
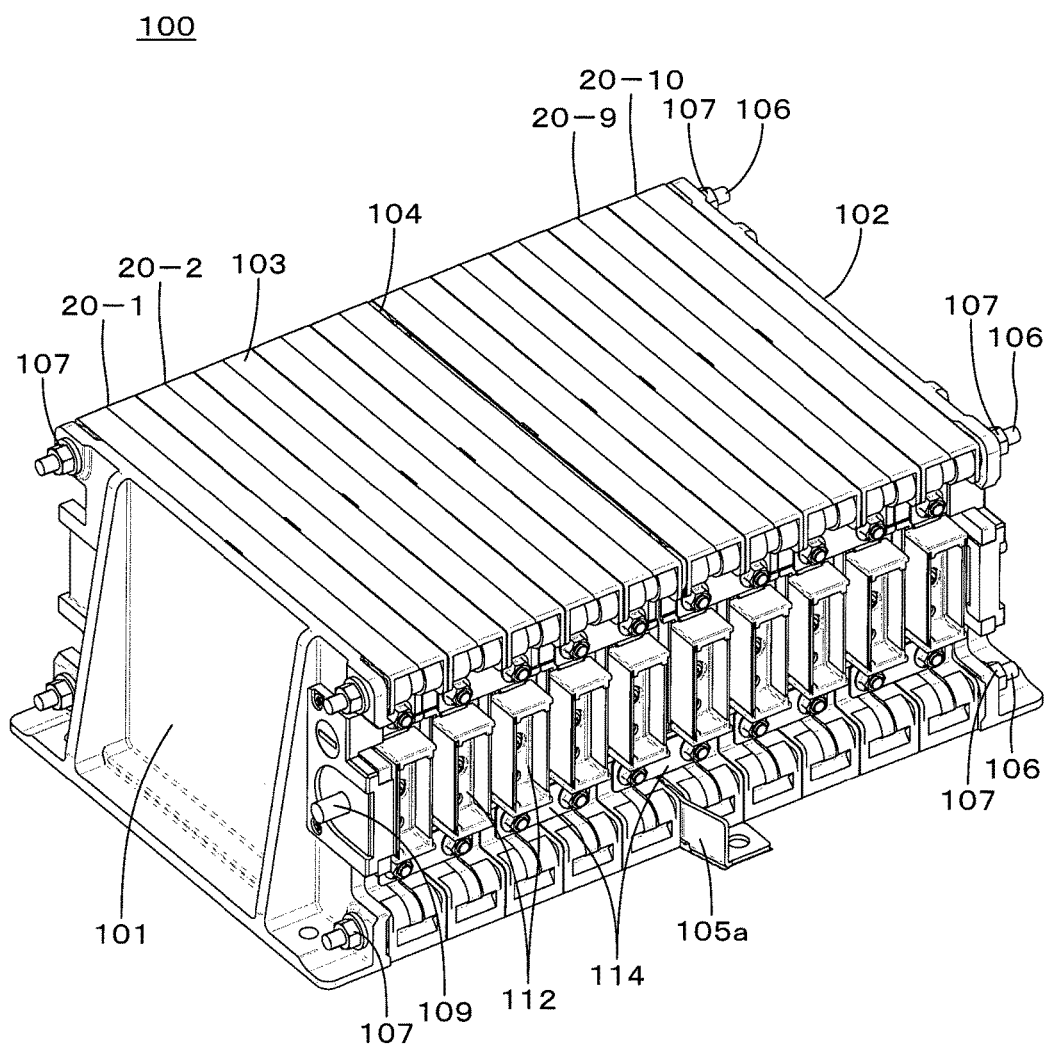
FIG. 3 is a perspective view illustrating an overall configuration of an embodiment of a battery module according to the present disclosure.

An embodiment of a battery module according to the present disclosure will now be described with reference to FIGS. 1, 2, and 3. FIG. 1 is a diagram illustrating six views (a front view, a right side view, a left side view, a bottom face view, a planar view, and a rear view) of a battery module 100. FIG. 2 is a cross-sectional view of the battery module 100. FIG. 3 is a perspective view of the battery module 100.

The battery module 100 includes a battery cell group 103 that is arranged between end plates 101 and 102, which serve as a first and a second regulating plate. An intermediate plate 104 is inserted in an intermediate position of the battery cell group 103. Attachment tabs 105a and 105b are formed at a lower portion of the intermediate plate 104. The intermediate plate 104 between the endplates 101 and 102 is a plate made from a metal such as aluminum or iron.

The battery cell group 103 is a stack formed from N-number of battery units configured from a plurality of battery cells each housed in a battery support body (hereinafter referred to as a "bracket"). In one embodiment, for example, two battery cells are housed in each bracket. The battery cell may be, for example, a lithium ion secondary battery. The bracket is a molded article formed from a synthetic resin. As illustrated in FIGS. 2 and 3, the battery cell group 103 is a stack formed from 10 battery units 20-1 to 20-10 (i.e., 20 battery cells). In cases where the individual battery cells do not need to be differentiated, the battery cells will be referred to simply as battery unit 20.

A shaft 106 passes through holes formed in the endplates 101 and 102, the intermediate plate 104, and the four corners of the battery cell group 103, and is secured by nuts 107 from either side. A heat-transfer plate 108 folded into an L-shape guided from each of the 10 brackets is exposed to the bottom face side of the battery cell group 103. This heat-transfer plate 108 is in contact with a cooling module (not shown). Heat generated by the battery cell is transmitted to the cooling module and released. Further, terminals 109 and 110 for extracting power from the battery module are provided near the end plates 101 and 102, respectively.

A plate-like conductive member (hereinafter referred to as "cell bus bar") for connecting the two battery cells in the battery unit is attached to either side face of each battery unit of the battery cell group 103. The cell bus bar is a conductive body formed by plating nickel on iron, for example, in a plate shape. Two types of cell bus bars are used. One type is a common cell bus bar 111 that commonly connects the two battery cells in each battery unit, and the other is an individual cell bus bar 112 for extracting from the terminals individually connected to both the positive and the negative electrode tabs of the two battery cells. Note that, as described below, although there are two types of individual cell bus bar 112 (individual cell bus bars 112a and 112b), in cases where these two types do not need to be differentiated, they will be referred to simply as individual cell bus bar 112.

In addition, a second plate-like conductive member (hereinafter referred to as "unit bus bar") 114 formed from aluminum or iron, for example, is used to connect between the battery units. The unit bus bar 114 is attached straddling a plurality of battery units so as to realize a desired battery connection. The common cell bus bar 111, the individual cell bus bar 112, and the unit bus bar 114 are fixed to a side face of the bracket by a screw, for example.

Battery Unit

Figure 4:
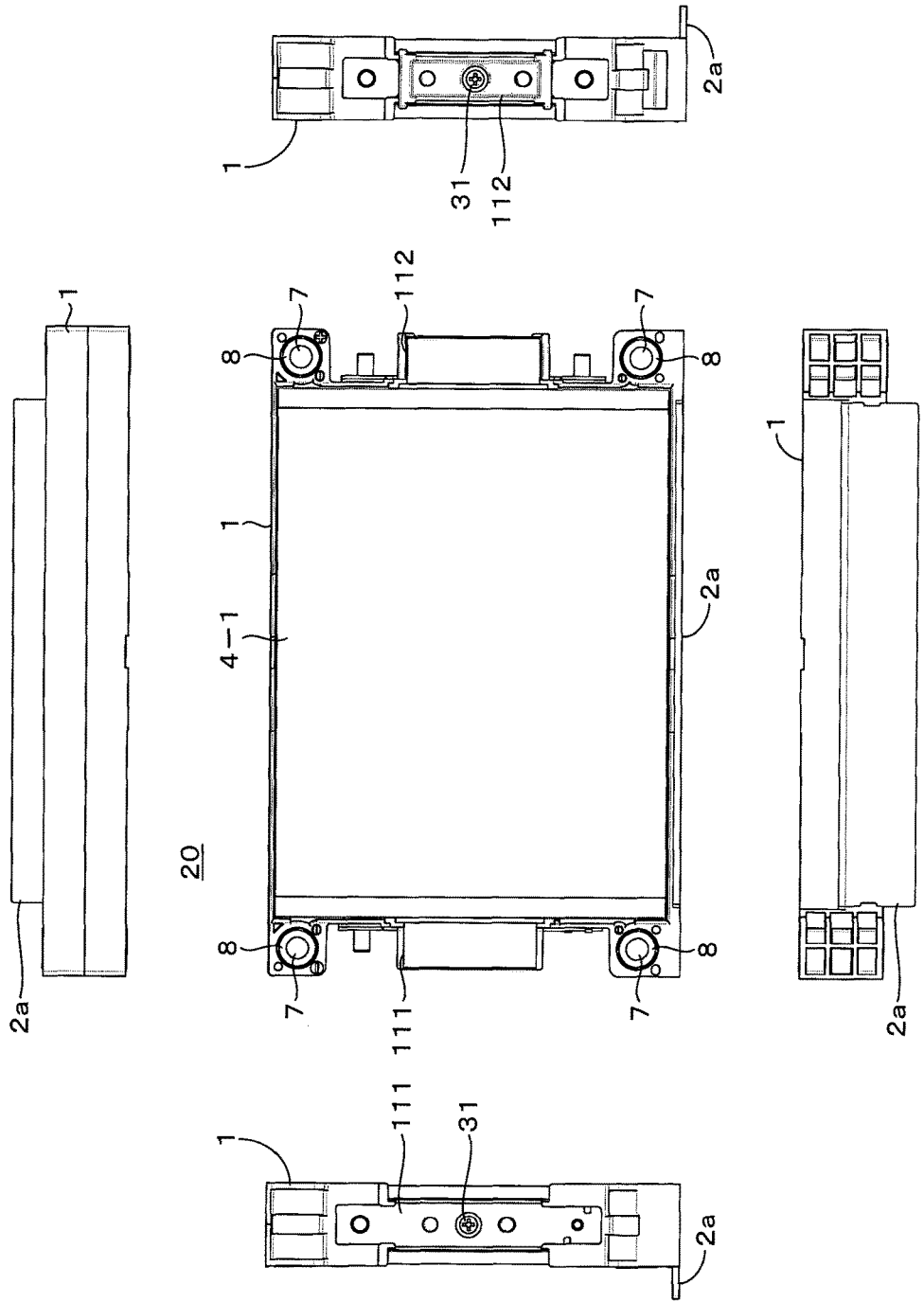
FIG. 4 is diagram illustrating a configuration of a battery unit according to the present disclosure.
Figure 6:
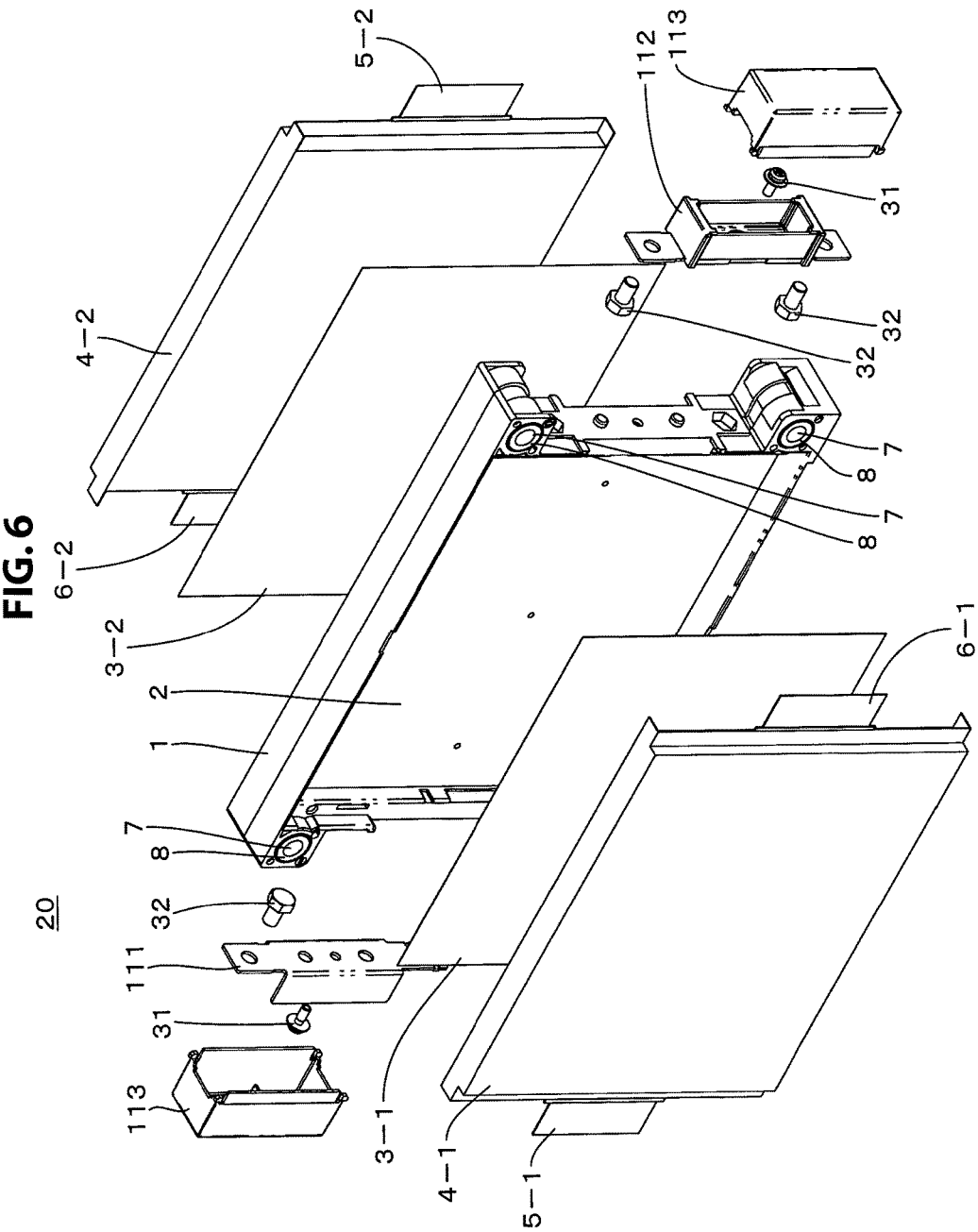
FIG. 6 is an exploded perspective view of a battery unit according to the present disclosure.
Figure 7:
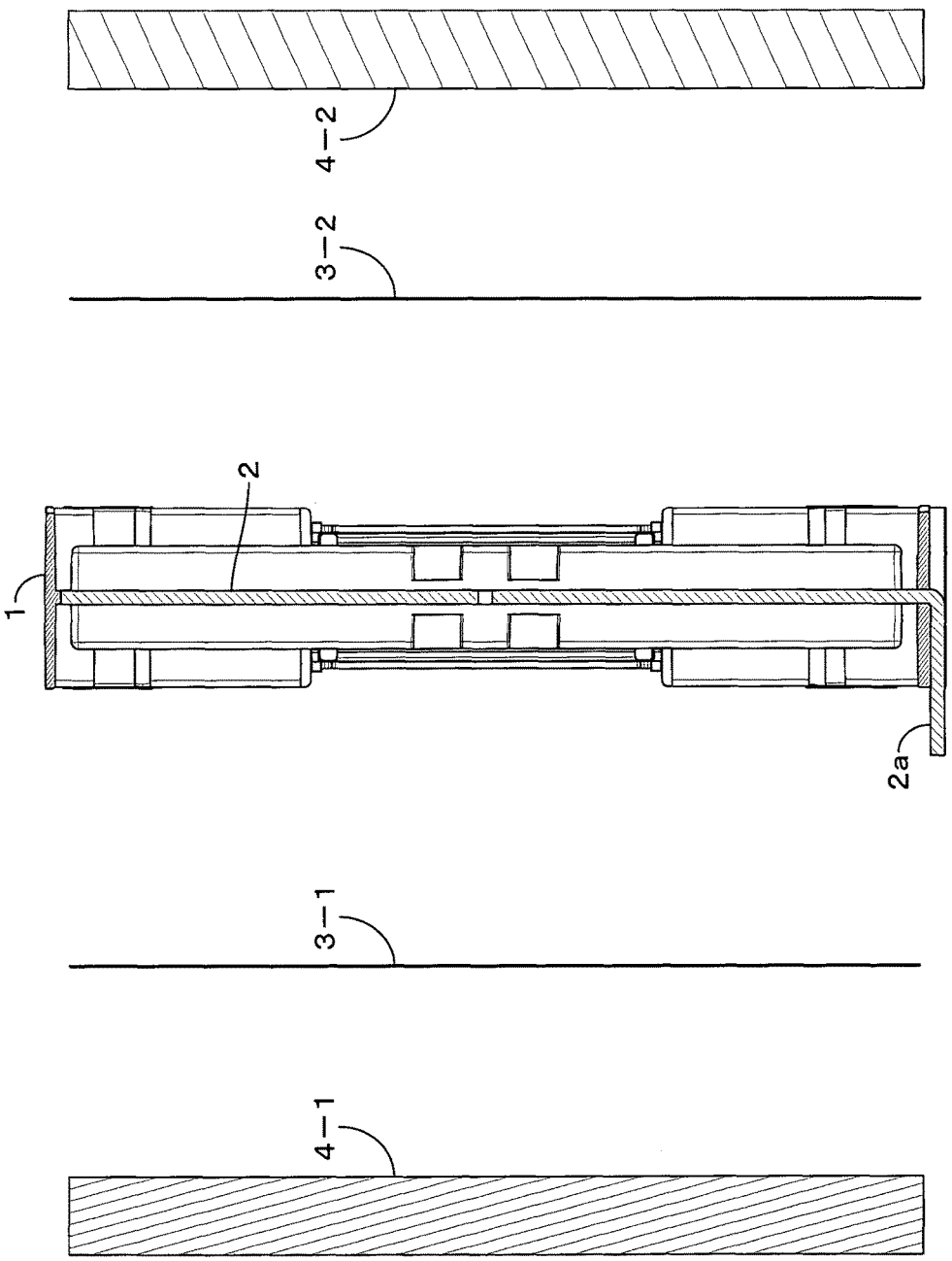
FIG. 7 is an exploded view of a battery unit according to the present disclosure.
Figure 8:
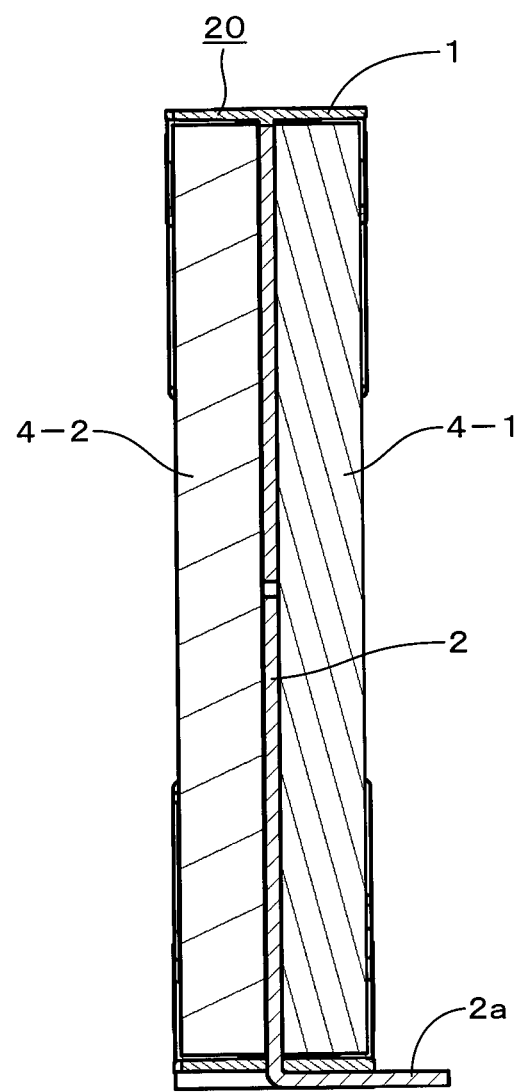
FIG. 8 is a schematic cross-sectional view of a battery unit according to the present disclosure.
Figure 9:
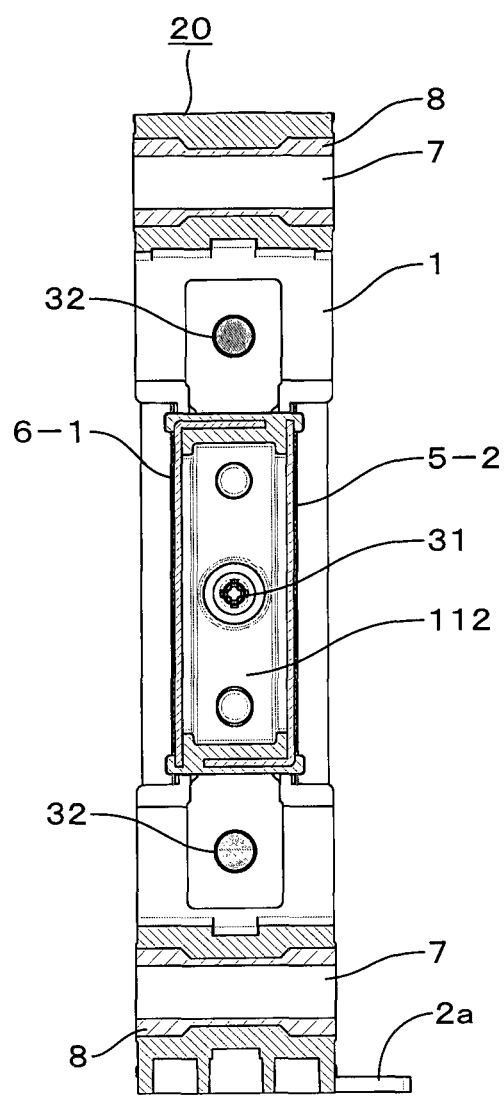
FIG. 9 is a partial cross-sectional view of a battery unit according to the present disclosure.

The battery unit 20, which is the basic unit forming the battery cell group 103, will now be described. The battery cell may be, for example, a lithium ion secondary battery. A plurality of battery cells, for example, two, are housed in a bracket to configure a battery unit. The bracket is a molded article formed from a synthetic resin. FIG. 4 is a front view, a right side view, a left side view, a bottom face view, and a planar view of the battery unit 20. FIG. 5 is a perspective view of the battery unit 20. FIG. 6 is an exploded perspective view of the battery unit 20. FIG. 7 is exploded view of the battery unit 20. FIG. 8 is a schematic cross-sectional view of the battery unit 20. FIG. 9 is a partial cross-sectional view of the battery unit 20.

The bracket 1, which is formed from an insulating material (synthetic resin), has a frame shape for housing the battery cells. A heat-transfer plate 2 (in FIGS. 1 to 3 illustrating the overall configuration of the battery module, the heat-transfer plate is denoted with the reference numeral 108) made of a metal such as aluminum is formed integrally with the bracket 1 by insert molding. Insert molding is a molding method for integrally forming a resin and an insert article by filling an insert article (here, the heat-transfer plate 2) serving as an embedding target into a mold, then injecting a resin into the molding machine, encasing the insert article with molten resin and solidifying.

The heat-transfer plate 2 is positioned at an aperture in the center of the bracket 1 to form a pasting face of the battery cell. Further, as illustrated in FIGS. 7 and 8, an edge portion of the heat-transfer plate 2 is folded in an almost L shape so as to protrude outwards from the bracket 1 and follow the side face of the bracket 1, thereby forming a folded portion 2a. The width of the folded portion 2a is slightly less than 1.5 times the width of the battery unit. Therefore, the tip of the folded portion 2a protrudes from the width of the battery unit. The folded portion 2a of the heat-transfer plate 2 is in contact with the cooling face of the cooling module. The cooling module is a water-cooled or air-cooled cooling device.

In an embodiment of the present disclosure, one edge of the heat-transfer plate 2 is folded into an L shape. However, the other edge of the heat-transfer plate 2 may also be similarly folded into an L shape so that it similarly protrudes outwards from the bracket 1. In addition, the tip may be formed into a cross-sectional T-shape or H-shape that extends toward both sides.

As illustrated in FIGS. 6 and 7, a main face of battery cells 4-1 and 4-2 is closely adhered to the face of the heat-transfer plate 2 that is integral with the bracket 1 via a thermally conductive pressure-sensitive adhesive sheet 3-1 and 3-2, respectively. In cases where the battery cells do not need to be individually differentiated, the battery cells will be referred to battery cell 4. The battery cell 4 has a plate shape or a cube shape. The face having the greatest surface area among the surfaces of the battery cell is called the main face.

A positive and a negative electrode tab is guided from both side faces of the battery cells 4-1 and 4-2. Whether an electrode tab is positive or negative depends on the attachment direction of the battery cells 4-1 and 4-2 to the bracket 1. For example, as illustrated in FIG. 6, a positive electrode tab 5-1 of the battery cell 4-1 and a negative electrode tab 6-2 of the battery cell 4-2 protrude from the side face on one side of the bracket, and a negative electrode tab 6-1 of the battery cell 4-1 and a positive electrode tab 5-2 of the battery cell 4-2 protrude from a side face on the other side of the bracket.

The common cell bus bar 111 is fixed by a screw 31 to one side face of the bracket 1, and the individual cell bus bar 112 is fixed by a screw 31 to the other side face of the bracket 1. The positive electrode tab 5-1 of the battery cell 4-1 and the negative electrode tab 6-2 of the battery cell 4-2 are joined by laser welding or the like to a tab joining plate of the common cell bus bar 111. The negative electrode tab 6-1 of the battery cell 4-1 and the positive electrode tab 5-2 of the battery cell 4-2 are joined by laser welding or the like to a tab joining plate of the individual cell bus bar 112. A bus bar cover 113 formed from an insulating material is detachably provided so as to cover both the common cell bus bar 111 and the individual cell bus bar 112.

A connecting portion is formed in each of the four corners of the bracket 1. A hole 7 that the shaft 106 (refer to FIG. 1) passes through is formed in the thickness direction of the bracket 1 in each connecting portion. To form the holes 7, as illustrated in FIG. 9, a metal sleeve (also referred to as a "collar") 8 is integrally formed with the bracket 1 by insert molding. Providing the metal sleeve 8 reduces the effect of changes in the environmental temperature during expansion and contraction.

If the metal sleeve 8 is not provided, this means that in a configuration in which the four corners are secured by the shaft 106, the resin parts of the bracket 1 contact each other, and are fixed by the shaft 106. If the environmental temperature changes, the shaft 106 and the bracket 1 expand (increase in temperature) or contract (decrease in temperature). Although the difference in the amount of expansion/contraction of the shaft 106 (metal) and the amount of expansion/contraction of the bracket 1 is small in a single battery unit, since a battery module (battery cell group 103) is formed from many battery units stacked on each other, this difference increases. Consequently, if a large force is applied on the bracket 1, the bracket 1 may break.

In contrast, by providing the metal sleeve 8, the battery units contact each other at the end face of the metal sleeve 8. Therefore, in the battery module, the difference in the amount of expansion/contraction of the shaft 106 (metal) and the amount of expansion/contraction of the bracket 1 can be reduced. In addition, since the metal sleeve 8 has a higher limit against compression than the bracket 1, damage to the bracket 1 can be prevented.

Battery Cell Configuration

Figure 10:
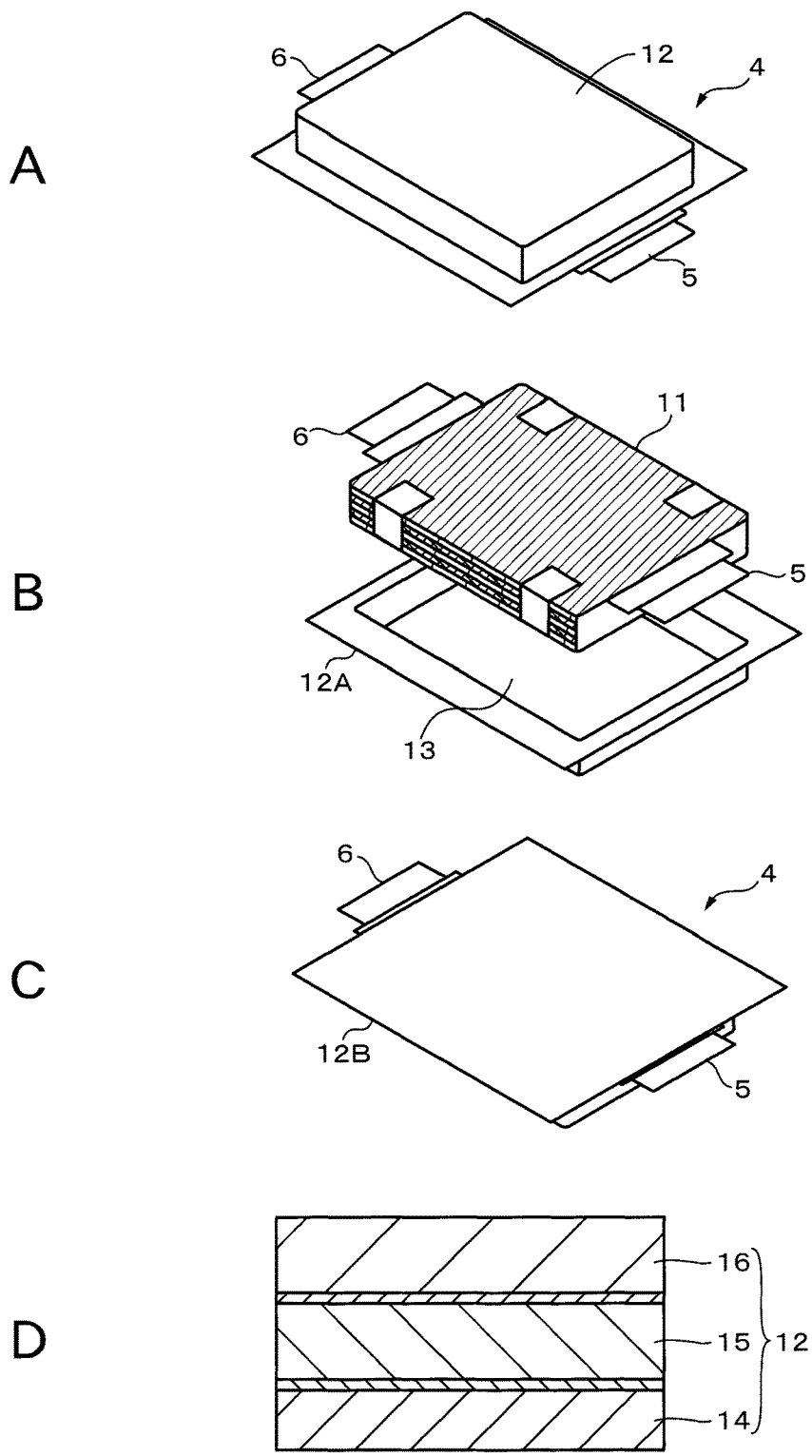
FIGS. 10A to 10D are perspective views and partial cross-sectional views of an exterior member illustrating an example of a battery cell that can be applied in the present disclosure.

FIG. 10A is a schematic diagram of the exterior of the battery cell 4 that can be used in the present disclosure. The battery cell 4 is a non-aqueous electrolyte battery, for example, a lithium ion secondary battery. FIG. 10B is a schematic diagram illustrating the configuration of the battery cell 4. It is noted that FIG. 10B illustrates a configuration for a case in which the bottom face and the top face of the battery cell 4 illustrated in FIG. 10A have been inverted. FIG. 10C is an exterior bottom face side of the battery cell 4. The battery cell 4 includes a battery element 11 and external cladding 12 that houses the battery element 11. The battery cell 4 has a first main face and a second main face.

The external cladding 12 is configured from a first external cladding portion 12A that houses the battery element 11, and a second external cladding portion 12B that functions as a lid for covering the battery element 11. It is preferred that the exterior cladding 12 and the battery element 11 are closely adhered.

The battery element 11 has a laminate-type electrode structure in which a roughly rectangular positive electrode and a roughly rectangular negative electrode arranged opposing the positive electrode are alternately laminated with a separator interposed therebetween. Further, a positive electrode current collector exposed portion electrically connected to each of a plurality of positive electrodes and a negative electrode current collector exposed portion electrically connected to each of a plurality of negative electrodes are drawn out from the battery element 11. A positive electrode tab 5 and a negative electrode tab 6 are connected to the positive electrode current collector exposed portion and the negative electrode current collector exposed portion, respectively.

Such a battery element 11 is cladded by the external cladding 12. The positive electrode tab 5 and the negative electrode tab 6 are guided to the outside of the battery cell 4 from a sealing portion of the external cladding 12. The external cladding 12 has a concave portion 13 on at least one face, or on both faces. This concave portion 13 is formed by deep drawing in advance. The battery element 11 is housed in this concave portion 13. In FIG. 10B, the concave portion 13 is formed in the external first external cladding portion 12A that forms the external cladding 12, and the battery element 11 is housed in this concave portion 13.

Further, the second external cladding portion 12B is arranged so as to cover the aperture of the concave portion 13, and adhered is by welding or the like to the periphery of the aperture of the concave portion 13, thereby sealing the battery cell 4. The positive electrode tab 5 and the negative electrode tab 6 are guided out from two opposing directions.

The external cladding 12 is, for example, a flexible film. As illustrated in FIG. 10D, the external cladding 12 has a structure obtained by laminating, in order, a heat-sealing resin layer 14, a metal layer 15, a surface protective layer 16, with an adhesive layer interposed therebetween. It is noted that the face of the heat-sealing resin layer 14 serves as the face on the side where the battery element 11 is housed. It is preferred that the surfaces of the heat-sealing resin layer 14 and the battery element 11 are closely adhered. Examples of the material for the heat-sealing resin layer 14 include polypropylene (PP) and polyethylene (PE). Examples of the material for the metal layer include aluminum alloy. Examples of the surface protective layer 16 include nylon (Ny) and polyethylene terephthalate (PET).

Specifically, for example, the external cladding 12 is configured from a rectangular aluminum laminate film obtained by pasting, in order, a polyethylene film, aluminum foil, and a nylon film. The external cladding 12 is configured so that, for example, the polyethylene film side and the battery element 11 are arranged opposite each other, with their outer edge portions closely adhered to each other by welding or an adhesive. It is noted that the external cladding 12 may be configured from a laminate film having some other structure, a polymer film of polypropylene and the like, or a metal film, instead of the above-described aluminum laminate film.

It is noted that the configuration of the battery cell that can be applied in the present disclosure is not limited to that described above. For example, a configuration may also be used in which a separator is formed in a long belt-like manner, folded back on itself in a switchback fashion, and a positive electrode and a negative electrode sandwiched between the folded separator. In addition, a configuration may be used in which a wound current collector to which a positive electrode lead and a negative electrode lead are attached is housed inside a film-like external cladding.

Battery Unit Stacking Configuration

For a vehicle requiring a high-power, high-capacity battery, as described above, the battery cell group 103 is configured by stacking a plurality of battery units, and connecting the battery cells in series and/or parallel. In an embodiment of the present disclosure, heat generated by the respective battery units is led to an external cooling module by the heat-transfer plate 2. Therefore, to ensure a heat release effect, the battery cell 4 and the heat-transfer plate 2 need to be closely adhered.

On the other hand, since cell expansion increases in proportion to the initial thickness, the battery cell 4 needs to press against the heat-transfer plate without damaging the battery cell in consideration of the cell expansion amount. From such a point, in an embodiment of the present disclosure, an elastic body for absorbing cell thickness expansion is interposed between battery units.

Figure 11:
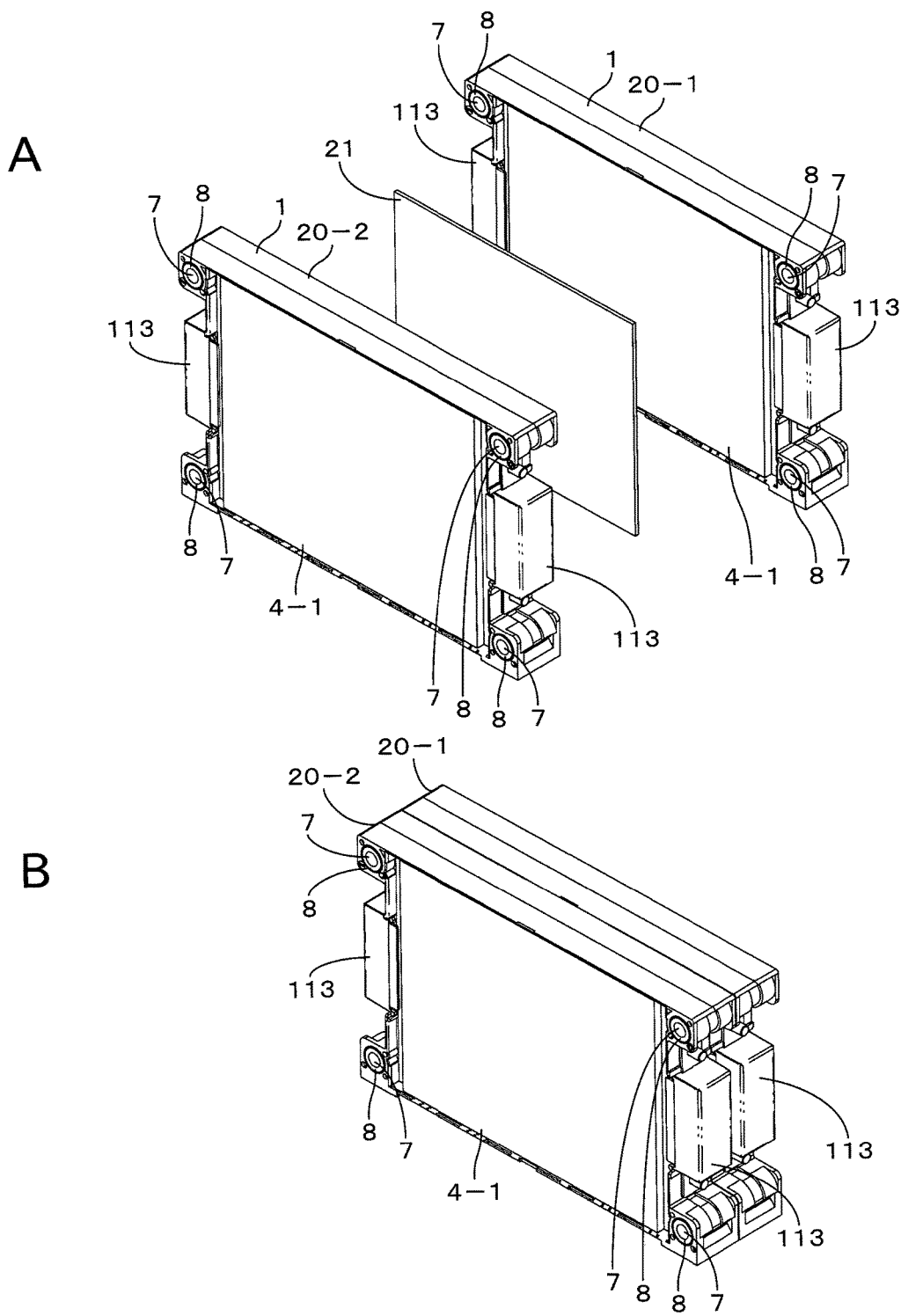
FIGS. 11A and 11B are perspective views illustrating a stacking configuration of battery units according to the present disclosure.

For example, as illustrated in FIGS. 11A and 12A, the two battery units 20-1 and 20-2 are arranged so that the battery cells 4-1 and 4-2 respectively included therein oppose each other. A cushion material 21 is placed as an elastic body in the space where the battery cells 4-1 and 4-2 oppose each other. The cushion material 21 is a thin plate-like material having roughly the same shape as the main faces of the battery cells 4-1 and 4-2. The cushion material 21 is formed from an elastic material that is deformed by pressure, and returns to its original shape when the pressure is released. For example, a urethane material can be used. In addition, the cushion is prevented from falling out by optionally providing a pressure-sensitive adhesive material on one or both faces of the cushion material 21.

Further, as illustrated in FIGS. 11B and 12B, two battery units 20-1 and 20-2 are stacked with the cushion material 21 interposed therebetween, and a predetermined pressure is applied in the stacking direction with the shaft 106 and nuts 107. As described above, the battery cell 4 uses a laminate film as external cladding, which expands due to cycle degradation and degradation over time. By using the cushion material 21 and appropriately setting the pressure applied between the battery units, battery cell expansion can be dealt with while maintaining the heat release effect obtained by the heat-transfer plate 2.

Setting of the pressure applied between the battery units will now be described with reference to the schematic diagram of FIG. 13. FIG. 13A illustrates an initial stage, and FIG. 13B illustrates when the battery cells 4-1 and 4-2 have expanded. The battery units 20-1 and 20-2 are stacked with an interval T between them. The thickness of each battery cell at the initial stage is represented as Tc. A gap G across which the battery units 20-1 and 20-2 oppose each other is represented by $G=T-2Tc$.

As illustrated in FIG. 13B, when battery cells 4-1 and 4-2 expand so that the thickness of each battery cell is Tc' (>Tc), a gap G' across which the battery units 20-1 and 20-2 oppose each other is $G'=T-2Tc'$ (G'<G). The cushion material 21 is arranged in the opposing gap G and G'. Therefore, the pressure is set so that at the opposing gap G during an initial stage, the cushion material 21 presses the battery cells 4-1 and 4-2 against the heat-transfer plate 2, and at the opposing gap G' during expansion, the pressure of the cushion material 21 pressing the battery cells 4-1 and 4-2 is not excessive.

Namely, when the minimum pressure required to press a battery cell against the heat-transfer plate 2 during an initial stage of the cell is represented as PL, the pressure at which the battery cell is not damaged is represented as PU, and the reaction force of the cushion material 21 compressed at a predetermined compressibility is represented as PC, the following relationship is satisfied.

$$PL<PC<PU$$

Bus Bar

As described above, cell bus bars for electrically connecting the battery cells in the bracket are attached to a side face of the bracket 1. The common cell bus bar 111 commonly connecting the positive and negative electrode tabs, for example, of the two battery cells in a battery unit is attached to one side face of the bracket 1, and the individual cell bus bar 112 is attached to the other side face.

A hole is formed on the side face of the bracket 1 for attachment. The above bus bars are screwed into these holes with a screw 31. In addition, positioning protrusions are formed on the side face of the bracket 1 above and below the attachment holes. Still further, a bearing that receives the head of a six-sided bolt 32 for stopping rotation of the six-sided bolt 32 is formed on the side face of the bracket 1.

The six-sided bolt 32 and the bus bars are electrically connected. The six-sided bolt 32 is a part for attaching the unit bus bar for electrically connecting the battery units to each other. Namely, the unit bus bar is attached by passing the six-sided bolt 32 through a hole formed in the unit bus bar, inserting a nut from the tip end, and tightening the nut.

Figure 16:
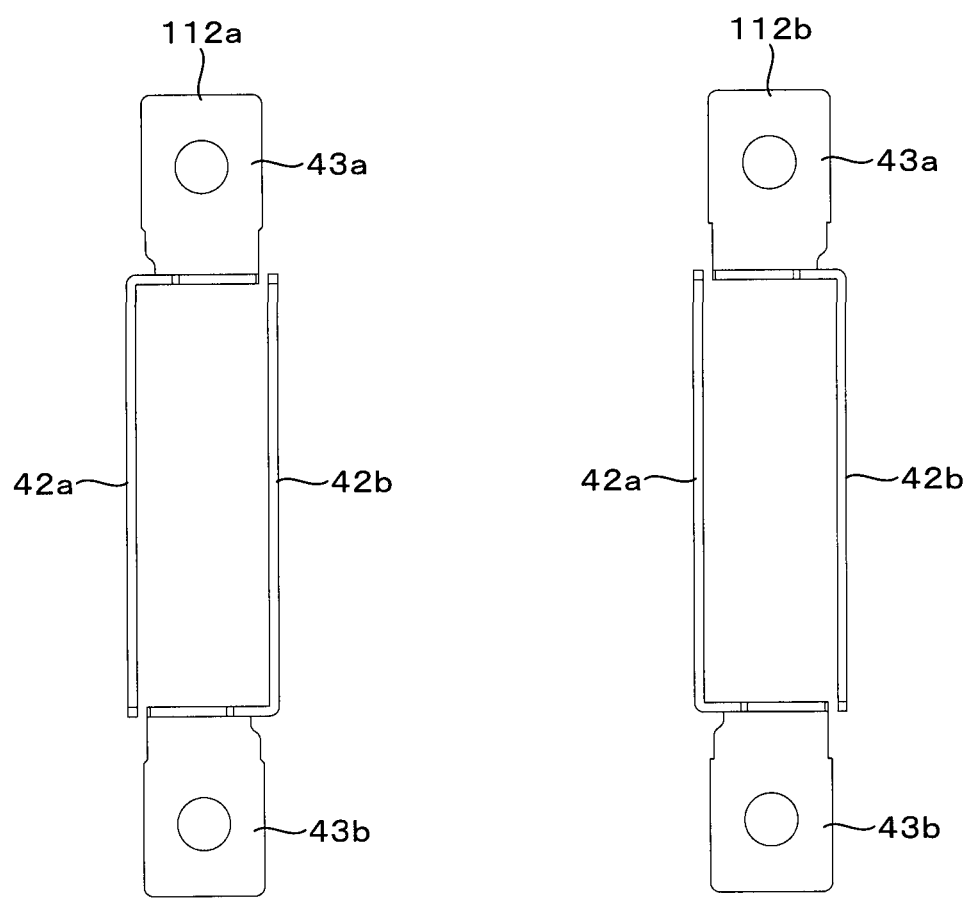
FIG. 16 is a front view illustrating an individual cell bus bar.

The individual cell bus bar 112 will now be described in more detail. To increase the degree of freedom in connection of the battery units, two types of individual separators 112$a$ and 112$b$ are readied as the individual cell bus bar 112. FIG. 14 is a front view, a right side, a left side view, a planar view, a cross-sectional view, and a perspective view of one of the individual separator 112$a$. FIG. 15 is a front view, a right side, a left side view, a planar view, a cross-sectional view, and a perspective view of the other individual separator 112$b$. FIG. 16 is a diagram illustrating only the electrode portions of each of the individual separators 112$a$ and 112$b$.

The individual separator 112$a$ is insert molded with an insulating member. In the resin portion, a hole 41 that the attachment screw 31 is inserted into is formed. Further, on either side of the hole 41, two holes are formed that the positioning protrusions are inserted into. On either side of the resin portion, tab joining plates 42$a$ and 42$b$ formed from a metal such as copper or stainless steel are provided in parallel. These tab joining plates 42$a$ and 42$b$ are the portion that the electrode tabs of the battery cells of the battery unit are welded to. In this case, of the two battery cells in the battery unit, the electrode tabs of nearby battery cells are joined to the tab joining plates 42$a$ and 42$b$.

The tab joining plate 42$a$ is guided as a connection tab 43$a$, and the tab joining plate 42$b$ is guided as a connection tab 43$b$. The connection tabs 43$a$ and 43$b$ are each formed with a hole for letting the six-sided bolt 32 pass through. On the connection tab 43$a$, an output with a polarity that is based on the electrode tab of the battery cell connected to the tab joining plate 42$a$ is extracted, and on the connection tab 43$b$, an output with a polarity based on the electrode tab of the battery cell connected to the tab joining plate 42$b$ is extracted.

Regarding the individual cell bus bar 112$b$ illustrated in FIG. 15, parts that correspond to the above-described individual cell bus bar 112$a$ are denoted with the same reference numeral. Although the individual cell bus bar 112$b$ has a similar configuration to the individual cell bus bar 112$a$, the connection tabs from which the battery cell power is extracted are different. Namely, on the connection tab 43$a$, an output with a polarity that is based on the electrode tab of the battery cell connected to the tab joining plate 42$b$ is extracted, and on the connection tab 43$b$, an output with a polarity based on the electrode tab of the battery cell connected to the tab joining plate 42$a$ is extracted.

Battery Unit Connection Method

The method for connecting the battery units using the cell bus bars and the unit bus bar will now be described. First, if there is only one type of cell bus bar, the common cell bus bar 111, a connection method like that illustrated in FIG. 17 is possible. Two battery cells are included in each of battery units 20-1 and 20-2 that are adjacent when stacked. The total of four battery cells are represented as BT1 to BT4.

If the battery cells are arranged in each battery unit so that the same polarity is connected to the same common cell bus bar 111, as illustrated in FIG. 17A, the polarity of the common cell bus bar 111 on one side face of the respective battery units is (+), and the polarity of the common cell bus bar 111 on the other side face is (−). When the common cell bus bars 111 are connected by the unit bus bar 114, as illustrated in FIG. 17B, all of the battery cells BT1 to BT4 are connected in parallel.

As illustrated in FIG. 17C, unlike FIG. 17A, if the direction of the battery unit 20-1 is reversed, as illustrated in FIG. 17D, the battery cells BT1 and BT2 are connected in parallel, and the battery cells BT3 and BT4 are connected in series. Reference numerals a1, a2, b1, and b2 are provided in order to illustrate the correspondence relationship between the common cell bus bar 111 and the connection configuration. Thus, when using only the common cell bus bar 111, the type of connection method between the battery units (battery cells) is limited.

In the above-described embodiment of the present disclosure, individual cell bus bars 112$a$ and 112$b$ are readied. For example, as illustrated in FIG. 18A, if the individual cell bus bar 112$b$ is attached to one side face of a battery unit (bracket), and the common cell bus bar 111 is attached to the other side face, the battery cells BT1 and BT2 in such a battery unit are connected in the relationship illustrated in FIG. 18B.

Figure 18:
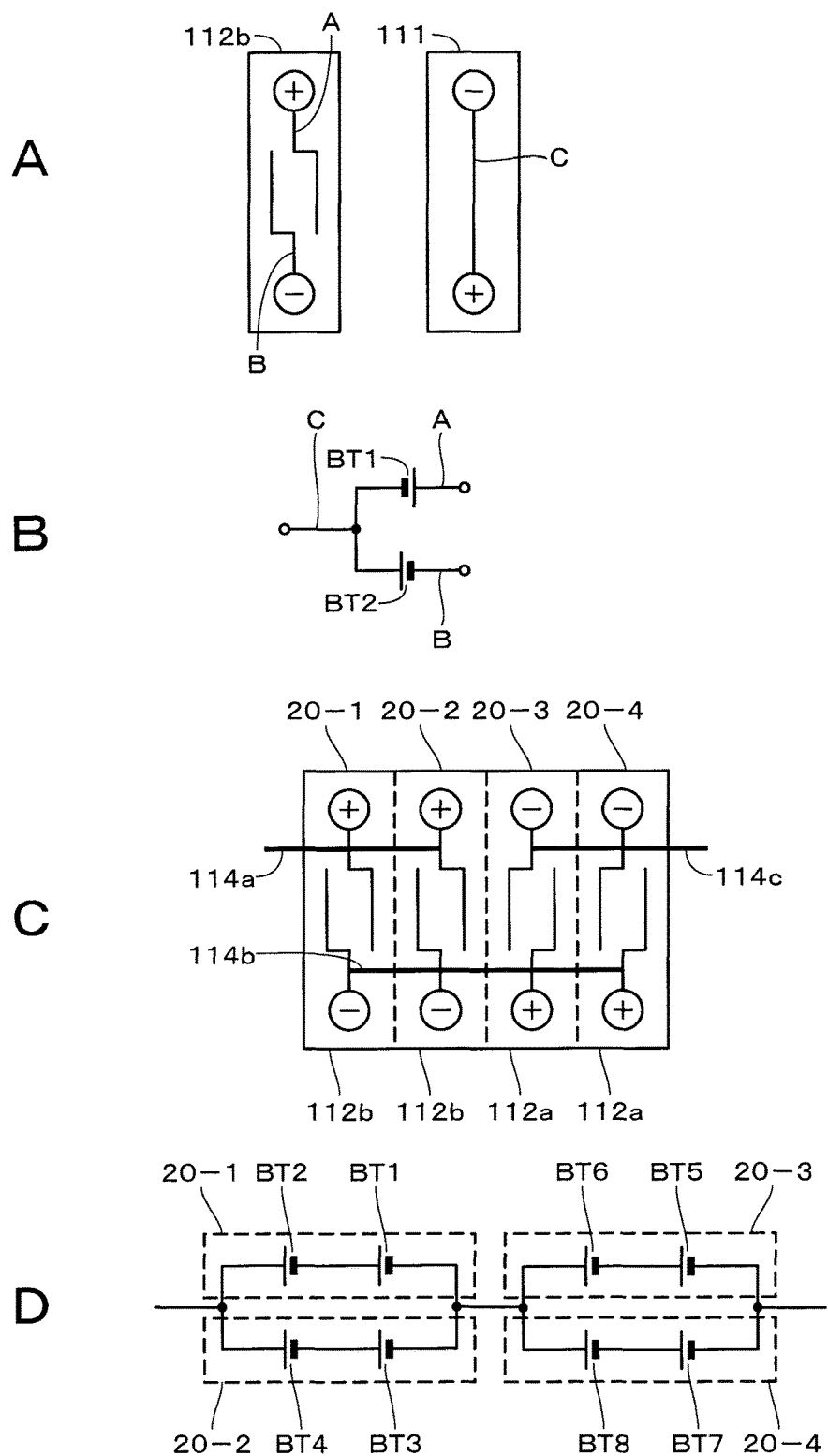
FIGS. 18A to 18D are font views and connection diagrams illustrating a connection part of an individual cell bus bar.

As an example, as illustrated in FIG. 18C, four battery units 20-1 to 2-4 are stacked, the battery units 20-1 and 20-2 have the individual cell bus bars 112$b$, and the battery units 20-3 and 20-4 have the individual cell bus bars 112$a$. The common cell bus bar 111 is provided on the side face on the opposite side to all of the battery units.

Further, the top side (+ side) of the two individual cell bus bars 112$b$ is connected by a unit bus bar 114$a$. The bottom side of the four individual cell bus bars 112$b$ is connected by a unit bus bar 114$b$, and the top side (− side) of the two individual cell bus bars 112$b$ is connected by a unit bus bar 114$c$. The arrangement relationship of the battery cells in each battery unit is the same. In this case, the connection relationship illustrated in FIG. 18D can be obtained.

FIG. 19 illustrates another example of a battery unit connection method. As illustrated in FIG. 19A, the individual cell bus bars 112$a$ and 112$b$ are attached to one side face of the battery units 20-1 to 20-4. As illustrated in FIG. 19B, the common cell bus bars 111 are attached to the other side face of the battery units 20-1 to 20-4. Further, the unit bus bars 114 are attached so that the individual cell bus bars of adjacent battery units are connected.

Figure 20:
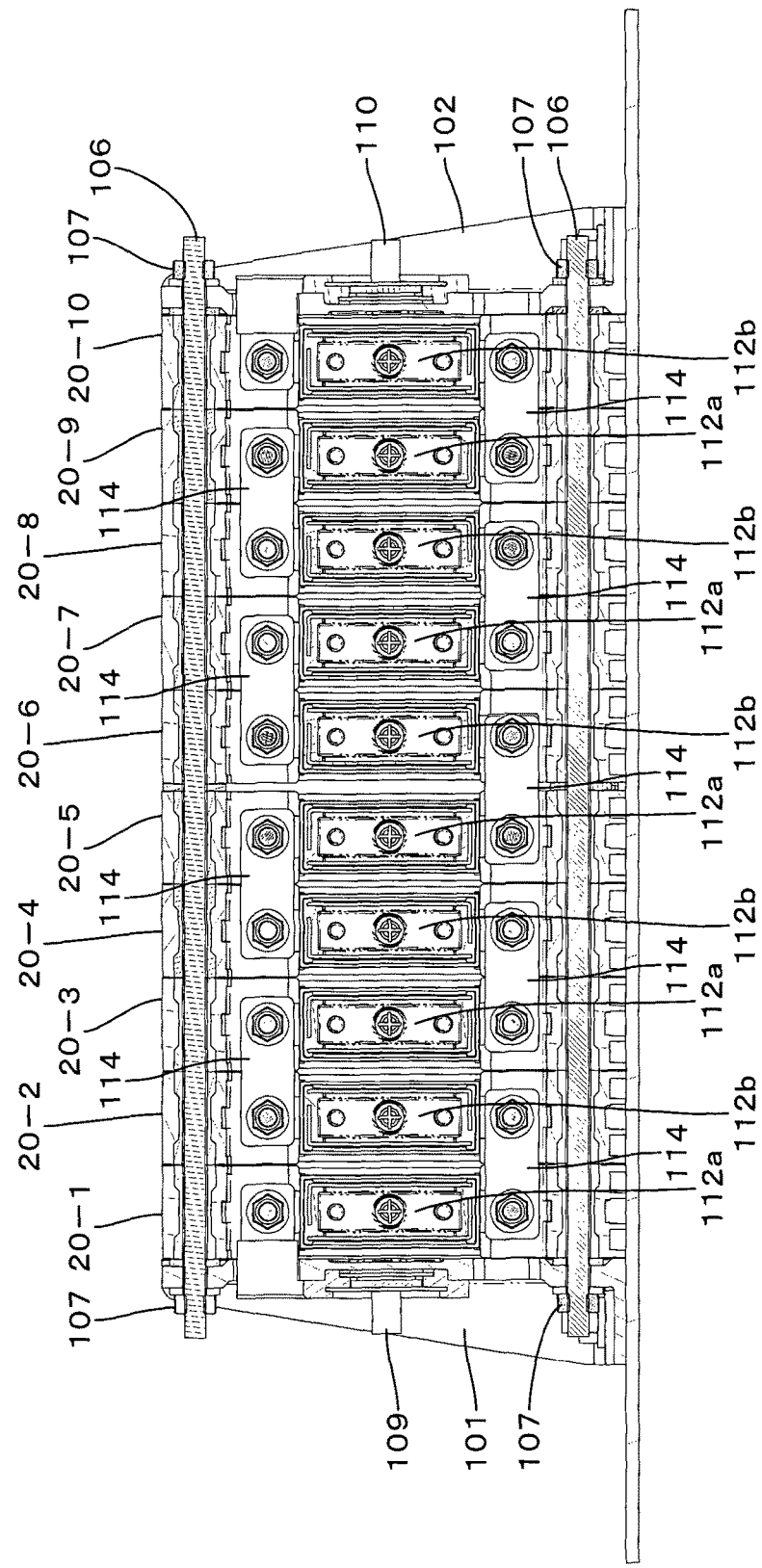
FIG. 20 is a font view illustrating attachment of a bus bar in a battery cell group.

In such a configuration, as illustrated in FIG. 19C, all of the battery cells BT1 to BT8 of the four battery units 20-1 to 2-4 are connected in series. As illustrated in FIG. 20, in a specific configuration of the battery module, the individual cell bus bars 112a and 112b and the unit bus bars 114 are attached. Based on this configuration, the twenty battery cells of the ten battery units 20-1 to 20-10 can be connected in series.

Home Power Storage System as Application Example

Figure 21:
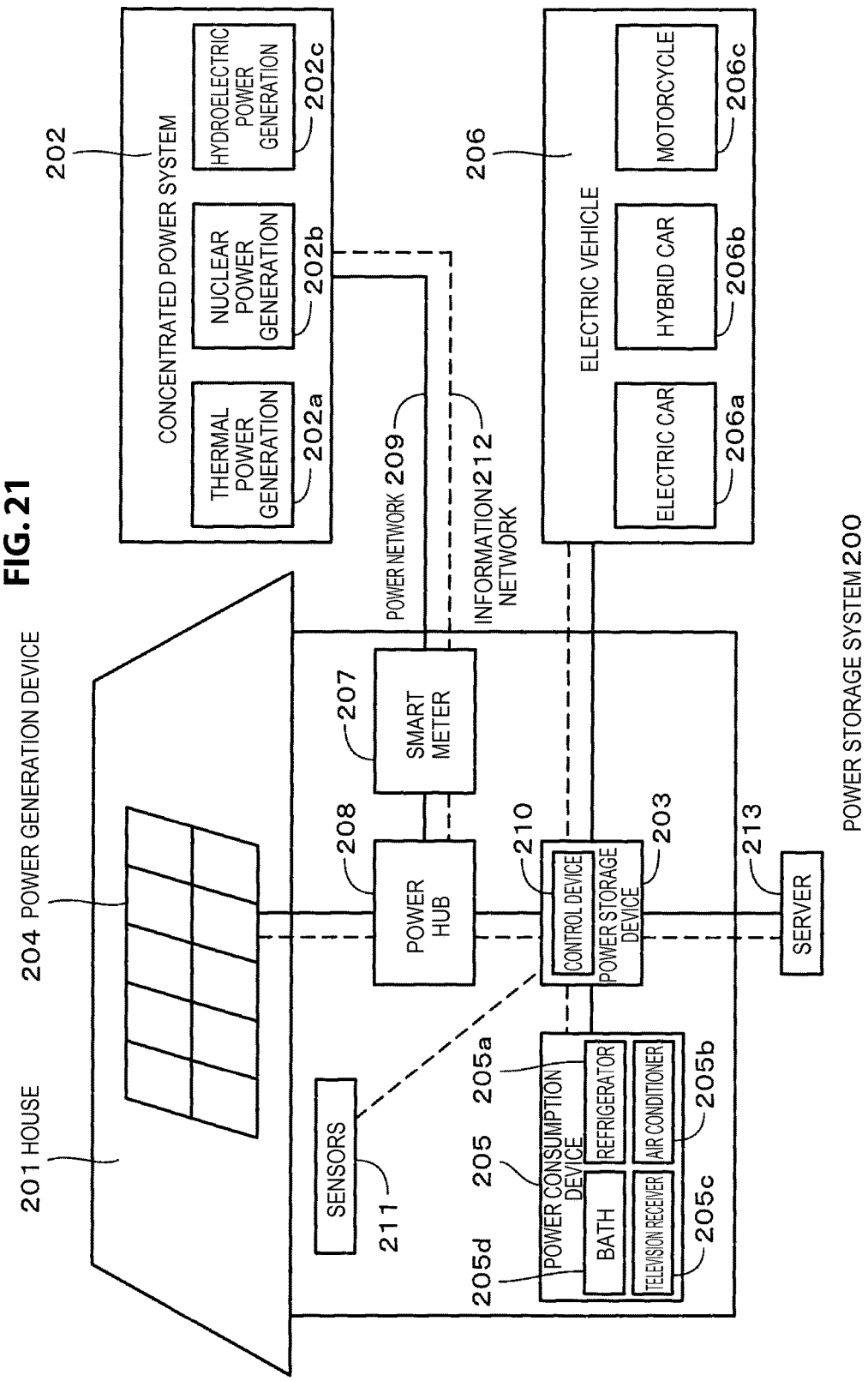
FIG. 21 is a schematic diagram illustrating an applied example of a battery module.

An example in which the present disclosure is applied in a home power storage system will be described with reference to FIG. 21. For example, in a power storage system 200 for a house 201, power is supplied to the power storage device 203 from a concentrated power system 202 including thermal power generation 202a, nuclear power generation 202b, hydroelectric power generation 202c, and the like, via a power network 209, an information network 212, a smart meter 207, a power hub 208, and the like. Further, power is supplied to the power storage device 203 from an independent power source such as a home power generation device 204. Power supplied to the power storage device 203 is stored, and power to be used in the house 201 is fed with use of the power storage device 203. The same power storage system can be used not only in the house 201 but also in a building.

The house 201 is provided with the power generation device 204, a power consumption device 205, the power storage device 203, a control device 210 which controls each device, the smart meter 207, and sensors 211 which acquires various pieces of information. The devices are connected to each other by the power network 209 and the information network 212. As the power generation device 204, a solar cell, a fuel cell, or the like is used, and generated power is supplied to the power consumption device 205 and/or the power storage device 203. Examples of the power consumption device 105 include a refrigerator 205a, an air conditioner 205b, a television receiver 205c, a bath 205d, and the like. Examples of the power consumption device 205 further include an electric vehicle 206 such as an electric car 206a, a hybrid car 206b, or a motorcycle 206c.

For the power storage device 203, the above-described battery module according to the present disclosure is used. The power storage device 203 is configured from a secondary battery or a capacitor. The power storage device 203 may be formed from a lithium ion battery for example. The lithium ion battery may be a stationary type, or may be a type used by the electric vehicle 206. Functions of the smart meter 207 include measuring the used amount of commercial power and transmitting the measured used amount to a power company. The power network 209 may be any one or more of DC power supply, AC power supply, and contactless power supply.

Examples of the various sensors 211 include a motion sensor, an illumination sensor, an object detecting sensor, a power consumption sensor, a vibration sensor, a touch sensor, a temperature sensor, an infrared sensor, and the like. Information acquired by the various sensors 211 is transmitted to the control device 210. With the information from the sensors 211, weather conditions, people conditions, and the like are caught, and the power consumption device 205 is automatically controlled so as to make the energy consumption minimum. Further, the control device 210 can transmit information about the house 201 to an external power company via the Internet, for example.

The power hub 208 performs processes such as branching off power lines and DC/AC conversion. Examples of communication schemes of the information network 212 connected to the control device 110 include a method using a communication interface such as UART (Universal Asynchronous Receiver/Transceiver), and a method using a sensor network according to a wireless communication standard such as Bluetooth, ZigBee, or Wi-Fi. A Bluetooth scheme can be used for multimedia communication, and one-to-many connection communication can be performed. ZigBee uses a physical layer of IEEE (Institute of Electrical and Electronics Engineers) 802.15.4. IEEE802.15.4 is the name of a near-field wireless network standard called PAN (Personal Area Network) or W (Wireless) PAN.

The control device 210 is connected to an external server 213. The server 213 may be managed by any of the house 201, an electric company, and a service provider. Examples of information transmitted and received by the server 213 include power consumption information, life pattern information, electric fee, weather information, natural disaster information, and information about power trade. Such information may be transmitted and received by the power consumption device (e.g., the television receiver 205c) in the house, or may be transmitted and received by a device (e.g., a mobile phone) outside the house. Further, such information may be displayed on a device having a display function, such as the television receiver 205c, the mobile phone, or the PDA (Personal Digital Assistant).

The control device 210 controlling each part is configured with a CPU (Central Processing Unit), a RAM (Random Access Memory), a ROM (Read Only Memory), and the like, and is stored in the power storage device 203 in this example. The control device 210 is connected to the power storage device 203, the home power generation device 104, the power consumption device 205, the various sensors 211, and the server 213 via the information network 212, and has a function of adjusting the used amount of commercial power and the power generation amount, for example. Note that the control device 210 may further have a function of performing power trade in the power market.

As described above, power generated by not only the concentrated power system 202 such as the thermal power generation 202a, the nuclear power generation 202b, and the hydroelectric power generation 202c, but also the home power generation device 204 (solar power generation or wind power generation) can be stored in the power storage device 203. Therefore, even when the power generated by the home power generation device 104 varies, the amount of power supplied to the outside can be constant, or only necessary discharge can be controlled. For example, power generated by the solar power generation can be stored in the power storage device 203 and also inexpensive power at midnight can be stored in the power storage device 203 during nighttime, so that power stored in the power storage device 203 can be discharged and used when the power fee is expensive during daytime.

Note that although this example shows the control device 210 housed in the inside of the power storage device 203, the control device 210 may be housed in the inside of the smart meter 207 or configured independently. Further, the power storage system 200 may be used for a plurality of houses in a multiple dwelling house or a plurality of separate houses.

Power Storage System in Vehicle as Application Example

Figure 22:
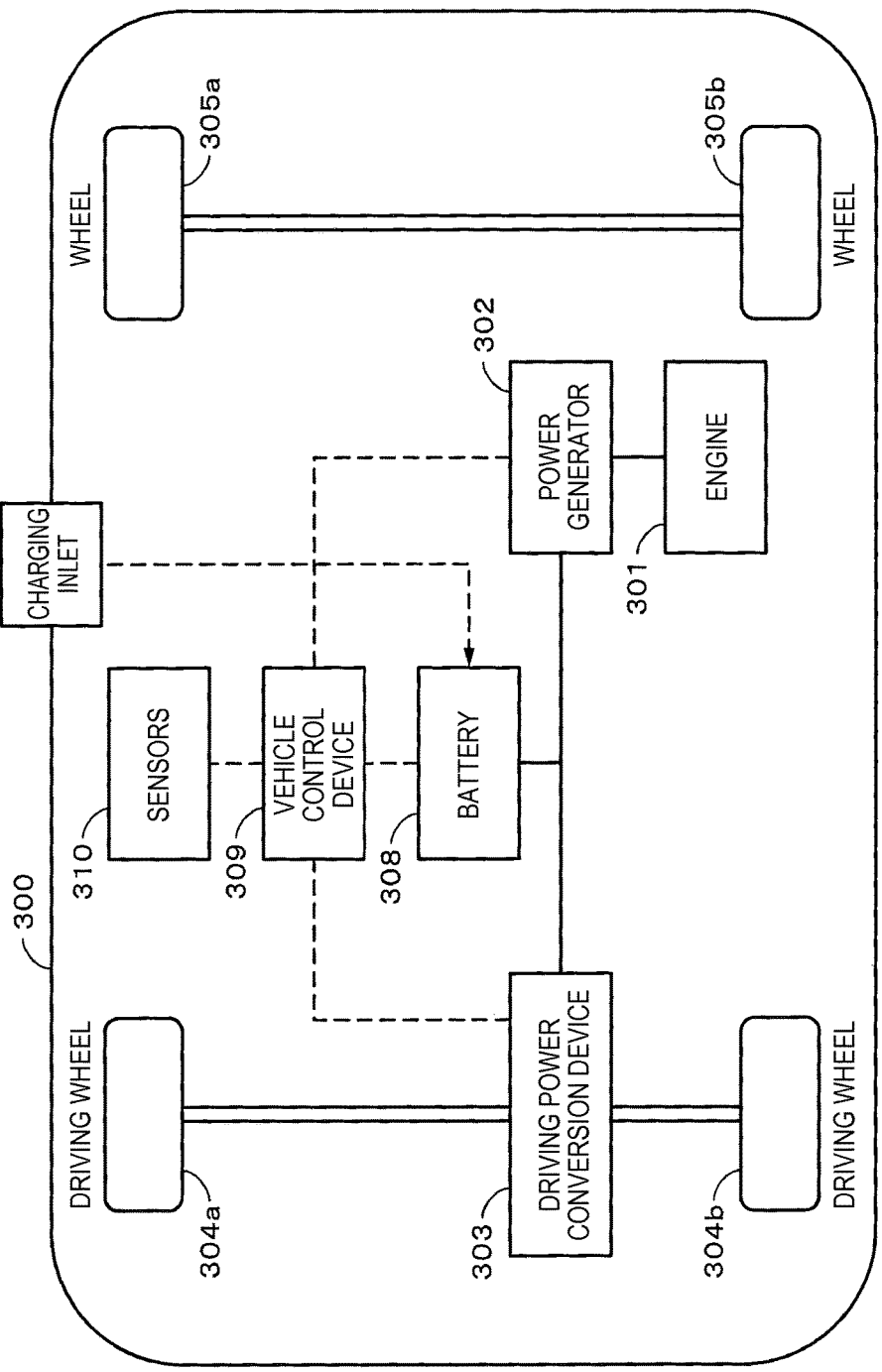
FIG. 22 is a schematic diagram illustrating another applied example of a battery module.

An example in which the present disclosure is applied to a power storage system for vehicles will be described with reference to FIG. 22. FIG. 22 schematically shows an example of a structure of a hybrid vehicle employing a series hybrid system to which an embodiment of the present disclosure is applied. The series hybrid system is a car which runs with a driving power conversion device using power generated by a power generator driven by an engine or power obtained by storing the power in a battery.

A hybrid vehicle 300 incorporates an engine 301, a power generator 302, a driving power conversion device 303, driving wheels 304a and 304b, wheels 305a and 305b, a battery 308, a vehicle control device 309, various sensors 310, and a charging inlet 311. For the battery 308, the battery unit according to the present disclosure is used.

The hybrid vehicle 300 runs by using the driving power conversion device 303 as a power source. One of examples of the driving power conversion device 303 is a motor. Power in the battery 308 drives the driving power conversion device 303, and the rotating power of the driving power conversion device 303 is transmitted to the driving wheels 304a and 304b. Note that by using DC/AC conversion or AC/DC conversion in a necessary portion, an alternate current motor or a direct current motor can be used for the driving power conversion device 303. The various sensors 310 control the number of engine rotation via the vehicle control device 309 and controls the aperture of an unshown throttle valve (throttle aperture). The various sensors 310 include a speed sensor, an acceleration sensor, a sensor of the number of engine rotation, and the like.

The rotating power of the engine 301 is transmitted to the power generator 302, and power generated by the power generator 302 with the rotating power can be stored in the battery 308.

When the hybrid vehicle 300 reduces the speed with an unshown brake mechanism, the resisting power at the time of the speed reduction is added to the driving power conversion device 303 as the rotating power, and regenerative power generated by the driving power conversion device 303 with this rotating power is stored in the battery 308.

The battery 308 can be connected to an external power source of the hybrid vehicle 300, and accordingly, power can be supplied from the external power source by using the charging inlet 311 as an input inlet, and the received power can be stored.

Although not shown, an information processing device which performs information processing about vehicle control based on information about the secondary battery may be provided. Examples of such an information processing device include an information processing device which displays the remaining battery capacity based on information about the remaining battery capacity.

Note that the above description is made by taking an example of the series hybrid car which runs with a motor using power generated by a power generator driven by an engine or power obtained by storing the power in a battery. However, an embodiment of the present disclosure can also be applied effectively to a parallel hybrid car which uses the output of an engine and a motor as the driving power source and switches three modes as appropriate: driving with the engine only; driving with the motor only; and driving with the engine and the motor. Further, an embodiment of the present disclosure can also be applied effectively to a so-called electric vehicle which runs by being driven with a driving motor only, without an engine.

Additionally, the present technology may also be configured as below.

(1)
A battery module including:
a plurality of stacked battery units,
wherein the battery unit is arranged in a manner that a face of a heat-transfer plate held by a battery support body formed from an insulating material and a main face of a battery cell oppose each other.

(2)
The battery module according to (1), wherein the plurality of battery units are stacked with an elastic material provided therebetween.

(3)
The battery module according to claim 2, wherein the elastic material is a thin plate-like elastic material having a shape almost identical to the main face of the battery cell.

(4)
The battery module according to (2) or (3), which is configured so as to satisfy the following relationship, wherein a pressure required to press the battery cell against the heat-transfer plate is represented as PL, a pressure at which the battery cell is not damaged is represented as PU, and a reaction force of the elastic material compressed at a predetermined compressibility is represented as PC.

$$PL<PC<PU$$

(5)
The battery module according to any one of (1) to (4), wherein the main face of the battery cell is arranged on both faces of the heat-transfer plate.

(6)
The battery module according to any one of (1) to (5), wherein the heat-transfer plate is insert-molded into the battery support body.

(7)
The battery module according to any one of (1) to (6), wherein an edge portion of the heat-transfer plate protrudes outwards from at least one side face of the battery support body.

(8)
The battery module according to any one of (1) to (7), wherein an edge portion of the heat-transfer plate is folded into a cross-sectional L shape or a cross-sectional T shape.

(9)
The battery module according to any one of (1) to (7), wherein the battery module have a regulating member configured to press the plurality of stacked battery units in a stacking direction.

(10)
The battery module according to (9), wherein the regulating member includes
a shaft that passes through a first and a second regulating plate positioned on either side of the battery cell group, and four corners formed by the first and the second regulating plates and the plurality of battery units, and
a fastening member configured to fasten the first and the second regulating plates and the battery cell group from both sides of the shaft.

(11)
The battery module according to (10), wherein a metal sleeve is arranged at a location where the shaft passes through the battery support body.

(12)
The battery module according to any one of (1) to (11), wherein a conductive member to which an electrode of the battery cell housed in the battery support body is joined is attached to a side face of the battery support body.

(13)
The battery module according to (12), wherein the conductive member includes
a common conductor configured to commonly connect a positive electrode of one of the battery cells in the battery support body with a negative electrode of another of the battery cells, and an individual conductor in which a positive electrode terminal connected to the positive electrode of one of the battery cells is separated from a negative electrode terminal connected to the negative electrode of the other battery cell.

(14)

A battery unit wherein a battery support body which holds a hot-transfer plate, the battery support body being formed from an insulating material, a face of the heat-transfer plate, and a main face of a battery cell are arranged to oppose one another.

(15)

A power storage system in which the battery module according to (1) is charged by a power generation device which generates power from renewable energy.

(16)

A power storage system including:
the battery module according to (1),
wherein the power storage system supplies power to an electronic device connected to the battery module.

(17)

An electronic device configured to receive power supplied from the battery module according to (1).

(18)

An electric vehicle including:
a conversion device configured to receive power supplied from the battery module according to (1) and convert the received power into driving power of a vehicle; and
a control device configured to perform information processing relating to vehicle control based on information about the battery module.

(19)

A power system including:
a power information transmitting/receiving unit configured to transmit/receive signals to/from other devices via a network,
wherein the power system is configured to control charge/discharge of the battery module according to (1) based on information received by the power information transmitting/receiving unit.

(20)

A power system configured to receive power supplied from the battery module according to (1), or to supply power to the battery module from a power generation device or a power network.

MODIFIED EXAMPLES

Although embodiments of the present disclosure were specifically described above, the present disclosure is not limited to the above-described various embodiments. Various modifications may be made based on the technical concept of the present disclosure. For example, the configurations, methods, steps, shapes, materials, and numerical values described in the above embodiments are merely examples. Different configurations, methods, steps, shapes, materials, and numerical values may be used as necessary.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST 1 bracket
2 heat-transfer plate
4, 4-1, 4-2 battery cell
5, 5-1, 5-2 positive electrode tab
6, 6-1, 6-2 negative electrode tab
8 metal sleeve
11 battery element
20, 20-1 to 20-10 battery unit
21 cushion material
42a, 42b tab joining plate
43a, 43b connection tab
100 battery module
101, 102 end plate
103 battery cell group
106 shaft
111 common cell bus bar
112, 112a, 112b individual cell bus bar
114 unit bus bar

The invention claimed is:

1. A battery module, comprising:
a plurality of battery units that are stacked,
wherein a first battery unit of the plurality of battery units includes:
a battery support body configured to hold a heat-transfer plate,
wherein the battery support body includes a metal sleeve, and
wherein the first battery unit of the plurality of battery units and a second battery unit of the plurality of battery units are in contact at an end face of the metal sleeve;
a first cell and a second cell that are housed in the battery support body,
wherein a first main face of the first cell is thermally coupled to a first face of the heat-transfer plate,
wherein an edge portion of the heat-transfer plate protrudes perpendicularly outwards from at least one side face of the first battery unit, and
wherein a first width of the edge portion is greater than a second width of the at least one side face of the first battery unit; and
at least one of an individual cell bus bar or a common cell bus bar attached to the battery support body,
wherein the individual cell bus bar includes two connection tabs,
wherein a first connection tab of the two connection tabs is connected to a first electrode of the first cell and a second connection tab of the two connection tabs is connected to a second electrode of the second cell, and
wherein the common cell bus bar is configured to commonly connect same polar electrodes of the first cell and the second cell.

2. The battery module according to claim 1, further comprising an elastic material between the first battery unit and the second battery unit of the plurality of battery units.

3. The battery module according to claim 2, wherein the elastic material is an elastic plate that has a shape identical to the first main face of the first cell.

4. The battery module according to claim 2,
wherein the battery module is configured to satisfy a relationship as follows:

PL <PC <PU, wherein PL represents a first pressure required to press the first cell against the heat-transfer plate,
wherein PU represents a second pressure at which the first cell is undamaged, and wherein PC represents a reaction force of the elastic material compressed at a compressibility.

5. The battery module according to claim 1, wherein a second main face of the second cell is on a second face of the heat-transfer plate.

6. The battery module according to claim 1, wherein the heat-transfer plate is insert-molded into the battery support body.

7. The battery module according to claim 1, further comprising a regulating member configured to press the plurality of battery units in a stacking direction.

8. The battery module according to claim 7, wherein the regulating member includes:
a first regulating plate on a first side of the battery module;
a second regulating plate on a second side of the battery module opposite to the first side;
a shaft configured to pass through a first hole in a first corner of the first regulating plate, and a second hole in a second corner of the second regulating plate; and
a fastening member configured to fasten the first regulating plate, the second regulating plate, and the plurality of battery units from both sides of the shaft.

9. The battery module according to claim 8, wherein the shaft is configured to pass through the metal sleeve in the battery support body.

10. The battery module according to claim 1, wherein at least one of the individual cell bus bar or the common cell bus bar is attached to a side face of the battery support body.

11. The battery module according to claim 10, wherein the common cell bus bar is further configured to commonly connect a positive electrode of the second cell with a negative electrode of the first cell.

12. The battery module according to claim 1, wherein the battery module is charged by a power generation device that generates power from renewable energy.

13. The battery module according to claim 1, wherein the battery module is configured to supply power to an electronic device.

14. The battery module according to claim 1, wherein a power system supplies power to the battery module from one of a power generation device or a power network.

15. The battery module according to claim 1, wherein a unit bus bar is electrically connected to at least one of a plurality of individual cell bus bars or a plurality of common cell bus bars.

16. A power storage system, comprising:
a battery module including a plurality of battery units that are stacked,
wherein a first battery unit of the plurality of battery units includes:
a battery support body configured to hold a heat-transfer plate,
wherein the battery support body includes a metal sleeve, and
wherein the first battery unit of the plurality of battery units and a second battery unit of the plurality of battery units are in contact at an end face of the metal sleeve;
a first cell and a second cell that are housed in the battery support body,
wherein a main face of the first cell is thermally coupled to a face of the heat-transfer plate,
wherein an edge portion of the heat-transfer plate protrudes perpendicularly outwards from at least one side face of the first battery unit,
wherein a first width of the edge portion is greater than a second width of the first battery unit, and
wherein the power storage system is configured to supply power to an electronic device connected to the battery module; and
at least one of an individual cell bus bar or a common cell bus bar attached to the battery support body,
wherein the individual cell bus bar includes two connection tabs,
wherein a first connection tab of the two connection tabs is connected to a first electrode of the first cell and a second connection tab of the two connection tabs is connected to a second electrode of the second cell, and
wherein the common cell bus bar is configured to commonly connect same polar electrodes of the first cell and the second cell.

17. An electric vehicle, comprising:
a battery module including a plurality of battery units that are stacked,
wherein a first battery unit of the plurality of battery units includes:
a battery support body configured to hold a heat-transfer plate,
wherein the battery support body includes a metal sleeve, and
wherein the first battery unit of the plurality of battery units and a second battery unit of the plurality of battery units are in contact at an end face of the metal sleeve;
a first cell and a second cell that are housed in the battery support body,
wherein a main face of the first cell is thermally coupled to a face of the heat-transfer plate,
wherein an edge portion of the heat-transfer plate protrudes perpendicularly outwards from at least one side face of the first battery unit, and
wherein a first width of the edge portion is greater than a second width of the first battery unit; and
at least one of an individual cell bus bar or a common cell bus bar attached to the battery support body,
wherein the individual cell bus bar includes two connection tabs,
wherein a first connection tab of the two connection tabs is connected to a first electrode of the first cell and a second connection tab of the two connection tabs is connected to a second electrode of the second cell, and
wherein the common cell bus bar is configured to commonly connect same polar electrodes of the first cell and the second cell;
a conversion device configured to:
receive power supplied from the battery module; and
convert the received power into driving power of the electric vehicle; and
a control device configured to process first information related to control of the electric vehicle based on second information related to the battery module.

18. A power system, comprising:
a battery module;
a power information exchange unit configured to one of transmit or receive signals; and
a control unit configured to control one of charge or discharge of the battery module based on the one of transmission or reception of signals from the power information exchange unit,
wherein the battery module includes a plurality of battery units that are stacked, and wherein a first battery unit of the plurality of battery units includes:
  a battery support body configured to hold a heat-transfer plate,
    wherein the battery support body includes a metal sleeve, and
    wherein the first battery unit of the plurality of battery units and a second battery unit of the plurality of battery units are in contact at an end face of the metal sleeve;
  a first cell and a second cell that are housed in the battery support body,
    wherein a main face of the first cell is thermally coupled to a face of the heat-transfer plate,
    wherein an edge portion of the heat-transfer plate protrudes perpendicularly outwards from at least one side face of the first battery unit, and
    wherein a first width of the edge portion is greater than a second width of the first battery unit; and
  at least one of an individual cell bus bar or a common cell bus bar attached to the battery support body,
    wherein the individual cell bus bar includes two connection tabs,
    wherein a first connection tab of the two connection tabs is connected to a first electrode of the first cell and a second connection tab of the two connection tabs is connected to a second electrode of the second cell, and
    wherein the common cell bus bar is configured to commonly connect same polar electrodes of the first cell and the second cell.

* * * * *